US012669598B2

(12) United States Patent
Hosseinian et al.

(10) Patent No.: US 12,669,598 B2
(45) Date of Patent: Jun. 30, 2026

(54) APPARATUS AND METHOD FOR NETWORK VERIFIED USER EQUIPMENT LOCATION FOR NON-TERRESTRIAL NETWORK

(71) Applicant: Samsung Electronics Co., Ltd., Gyeonggi-do (KR)

(72) Inventors: Seyed Mohsen Hosseinian, San Diego, CA (US); Philippe Jean Marc Michel Sartori, Naperville, IL (US); Yuhan Zhou, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 253 days.

(21) Appl. No.: 18/347,991

(22) Filed: Jul. 6, 2023

(65) Prior Publication Data

US 2024/0012132 A1 Jan. 11, 2024

Related U.S. Application Data

(60) Provisional application No. 63/443,566, filed on Feb. 6, 2023, provisional application No. 63/397,061, filed
(Continued)

(51) Int. Cl.
| | |
|---|---|
| G01S 13/76 | (2006.01) |
| G01S 13/87 | (2006.01) |
| H04W 64/00 | (2009.01) |

(52) U.S. Cl.
CPC .......... G01S 13/765 (2013.01); G01S 13/878 (2013.01); H04W 64/00 (2013.01)

(58) Field of Classification Search
CPC ...... G01S 13/765; G01S 13/878; G01S 7/006; H04W 64/00
See application file for complete search history.

(56) References Cited

U.S. PATENT DOCUMENTS

| | | |
|---|---|---|
| 9,736,629 B2 | 8/2017 | Woo et al. |
| 10,396,883 B2 | 8/2019 | Radulescu et al. |
| | (Continued) | |

FOREIGN PATENT DOCUMENTS

WO WO 2022/212139 10/2022

OTHER PUBLICATIONS

3GPP TR 22.926 V18.0.0, 3GPP, 3rd Generation Partnership Project; Technical Specification Group Services and System Aspects; Guidelines for Extraterritorial 5G Systems; Stage 1 (Release 18), Dec. 2021, 22 pages.

*Primary Examiner* — Dhaval V Patel
(74) *Attorney, Agent, or Firm* — The Farrell Law Firm, P.C.

(57) ABSTRACT

A system and a method are disclosed for verifying reported measurements for UE location. A method of network verified UE location includes configuring, by a network device, a base station with a first resource for transmitting a PRS to a UE at a time t1; configuring, by the network device, the UE with a second resource for transmitting an SRS to the base station at a time t3; receiving, by the network device, from the base station, a value for t1 and a value for t4, wherein the base station is configured to receive the SRS from the UE at a time t4; receiving, by the network device, from the UE, a value for t2 and a value for t3, wherein the UE is configured to receive the PRS from the base station at a time t2; and verifying, by the network device, the values for t2 and t3 received from the UE, based the received values for t1, t2, t3, and t4.

20 Claims, 15 Drawing Sheets

Related U.S. Application Data on Aug. 11, 2022, provisional application No. 63/359,582, filed on Jul. 8, 2022.

(56) References Cited

U.S. PATENT DOCUMENTS

| | | | |
|---|---|---|---|
| 11,469,815 | B2 | 10/2022 | Hsieh et al. |
| 2017/0171714 | A1* | 6/2017 | Cai ........................ G01S 5/0036 |
| 2021/0314734 | A1* | 10/2021 | Mehta ................... G01S 19/428 |
| 2022/0086671 | A1 | 3/2022 | Hong |
| 2022/0094430 | A1 | 3/2022 | Edge |
| 2022/0150865 | A1 | 5/2022 | Cha et al. |
| 2022/0173857 | A1 | 6/2022 | Michalopoulos et al. |
| 2022/0353837 | A1 | 11/2022 | Hosseinian et al. |
| 2023/0036092 | A1 | 2/2023 | Bao et al. |
| 2024/0073851 | A1* | 2/2024 | Yerramalli ............ H04W 64/00 |
| 2024/0259985 | A1* | 8/2024 | Ren ........................ G01S 5/0236 |
| 2024/0292347 | A1* | 8/2024 | Manolakis ......... H04B 7/18519 |
| 2024/0314724 | A1* | 9/2024 | Manolakos ........... H04L 5/0051 |
| 2024/0323895 | A1* | 9/2024 | Manolakos ........... H04L 5/0051 |

* cited by examiner

APPARATUS AND METHOD FOR NETWORK VERIFIED USER EQUIPMENT LOCATION FOR NON-TERRESTRIAL NETWORK

CROSS-REFERENCE TO RELATED APPLICATION

This application claims the priority benefit under 35 U.S.C. § 119(e) of U.S. Provisional Application Nos. 63/443,566, 63/397,061, and 63/359,582, filed on Feb. 6, 2023, Aug. 11, 2022, and Jul. 8, 2022, respectively, the disclosure of each of which is incorporated by reference in its entirety as if fully set forth herein.

TECHNICAL FIELD

The disclosure generally relates to verifying a user equipment (UE) location for single satellite and multiple satellite scenarios in a non-terrestrial network (NTN). More particularly, the subject matter disclosed herein relates to a multi-round trip time (RTT) approach that allows the NTN, and specifically, a location management function (LMF) therein, to verify reported measurements by a UE in order to determine reliability.

SUMMARY

In 3$^{rd}$ generation partnership project (3GPP) new radio (NR), when a UE attaches to a mobile network, a radio access network (RAN) selects an appropriate core network (CN) for the UE. To do so, the RAN takes into account attributes of the UE, such as a UE identifiers (IDs), a UE's selected public land mobile network (PLMN), and a UE's location information (including a serving cell as known to a serving RAN node).

Generally, an NTN deploys very large cells over large section of a continent that may cover two or more different countries. In such cases, different CNs may belong to two or more countries connected to the same NTN RAN (e.g., a multi-operator CN (MOCN) sharing scenario). In such a scenario, it may not be possible to correctly determine the right CN for a connecting UE, e.g., if the connecting UE is near a country border, since serving cell information may not be granular and/or accurate enough.

Additionally, a malicious UE may fraudulently falsify a selected PLMN in order to maliciously connect to a different CN. Upon such a malicious attempt, an access and mobility management function (AMF) should disconnect the UE and inform the RAN node via an appropriate NG application protocol (NGAP) cause value, such that the RAN can take appropriate punitive actions on subsequent connection attempts by the same UE.

To solve these types of problems, a UE may send global navigation satellite system (GNSS) measurements to the RAN over radio resource control (RRC) such that network verifies the UE location. However, this approach still has a number of drawbacks.

For example, the same way that a malicious UE could falsify its selected PLMN, it could also falsify its GNSS measurements. Also, sending GNSS measurements to the RAN over RRC, before non-access stratum (NAS) security is set up, could raise privacy and security issues.

Therefore, relying on the signaling of GNSS measurements over RRC is not a sufficient solution for these issues.

To overcome these issues, systems and methods are described herein for UE location verification by a network, which do not rely on information reported by the UE using a GNSS positioning system.

More specifically, systems and methods are described herein, which allow an LMF network element or device (referred to simply as "an LMF" herein) to check the validity of reported measurements by a UE.

For example, multi-RTT is a positioning technique that relies on reports by a UE to an LMF. However, for an NTN, a need exists for a technique that is robust to possibly false reports made by a malicious UE.

Accordingly, systems and methods are described herein, which modify the existing multi-RTT techniques such that an LMF is able to check the validity of the reported measurements by the UE.

In an embodiment, a method is provided for network verified UE location. The method includes configuring, by a network device, a base station with a first resource for transmitting a positioning reference signal (PRS) to a UE at a time t1; configuring, by the network device, the UE with a second resource for transmitting a sounding reference signal (SRS) to the base station at a time t3; receiving, by the network device, from the base station, a value for t1 and a value for a time t4, wherein the base station is configured to receive the SRS from the UE at t4; receiving, by the network device, from the UE, a value for a time t2 and a value for t3, wherein the UE is configured to receive the PRS from the base station at t2; and verifying, by the network device, the values for t2 and t3 received from the UE, based the received values for t1, t2, t3, and t4.

In an embodiment, a network device is provided for performing network verified UE location. The network device includes a processor; and a memory configured to store instructions, which when executed, control the processor to configure a base station with a first resource for transmitting a positioning reference signal (PRS) to a UE at a time t1, configure the UE with a second resource for transmitting sounding reference signal (SRS) to the base station at a time t3, receive, from the base station, a value for t1 and a value for a time t4, wherein the base station is configured to receive the SRS from the UE at t4, receive, from the UE, a value for a time t2 and a value for t3, wherein the UE is configured to receive the PRS from the base station at t2, and verify, by the network device, the values for t2 and t3 received from the UE, based the received values for t1, t2, t3, and t4.

BRIEF DESCRIPTION OF THE DRAWING

In the following section, the aspects of the subject matter disclosed herein will be described with reference to exemplary embodiments illustrated in the figures, in which.

DETAILED DESCRIPTION

Figure 1:
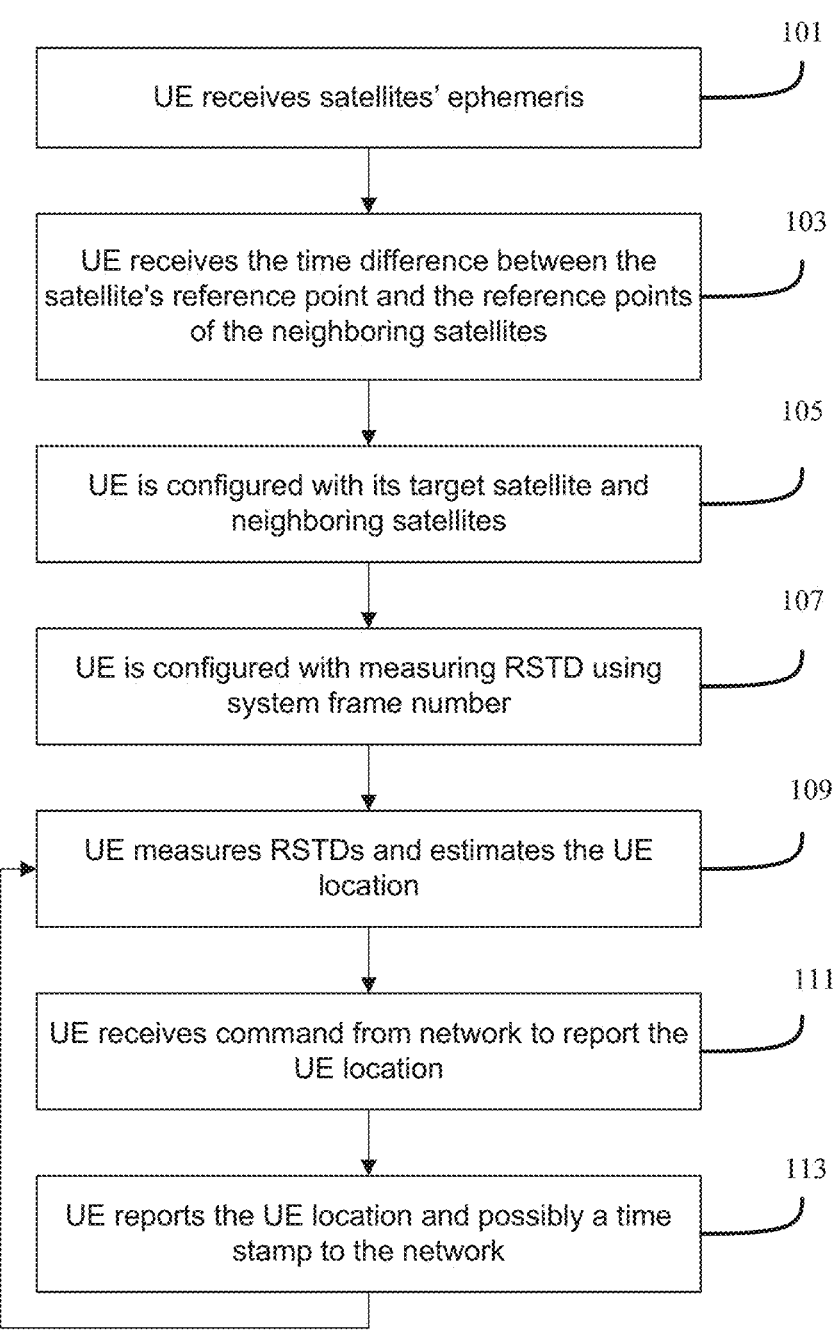
FIG. 1 is a flow chart illustrating a UE location report method using system subframe timing of several satellites, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

As described above, in 3GPP NR when a UE attaches to a mobile network, a RAN selects an appropriate CN for the UE. To do so, the RAN may takes into account UE attributes, such as a UE ID, a UE's selected PLMN, and UE location information (e.g., a serving cell known to a serving RAN node).

As an NTN is typically deployed over very large cells of large section of a continent that could possibly cover two or even more different countries, different CNs may belong to two or more countries connected to the same NTN RAN (e.g., an MOCN network sharing scenario). In such a scenario, it may not be possible to correctly determine the appropriate CN for a connecting UE, especially, if the UE is near a country border, since the serving cell information may not be granular and/or accurate enough.

Additionally, a malicious UE might fraudulently falsify its selected PLMN in order to maliciously connect to a different CN. Upon such a malicious attempt an AMF should disconnect the UE and inform the RAN node via an appropriate NGAP cause value, such that the RAN can take appropriate punitive actions on subsequent connection attempts by the same UE.

While a UE may send GNSS measurements to the RAN over RRC in order for a network to verify the UE's location, this approach also has a number of drawbacks. For example, the same way that a malicious UE could falsify its selected PLMN, the malicious UE could also falsify its GNSS measurements. Additionally, sending GNSS measurements to the RAN over RRC, before NAS security is set up, raises privacy and security issues.

Therefore, location information should be sent after NAS security is established. However, even after establishment of NAS security, depending on regional regulations and/or policies, user consent for obtaining UE location information may also be required.

For practical purposes, at least some information that a UE supplies to a network has to be considered as trusted; otherwise, it will be practically impossible to verify the UE's location in a trustworthy manner. In other words, it is not usually assumed that all information, such as selected PLMN, GNSS measurements, and RRC measurements are all false at the same time.

For the sake of traffic load management, it may not be desirable to cover an entire part of a continent, including multiple countries, with a single cell. In real deployment scenarios, the served cell information may typically be more granular. Accordingly, in Rel-17 the above-described issues have not been regarded as problems.

A UE's location should be possible to be determined in a 5G NR system with NTN satellite access. For example, this may be necessary in order to provide various services, such as route traffic, support emergency calls, etc., in accordance to national or regional governing regulatory requirements applicable to the UE. Since such regulatory requirements always exist, even when providing services over entire continents with NTN, there may not be a "globally harmonized" set of requirements that overrules local and regional requirements. UE location information requirements may follow this rule as well.

As described above, network operators of 3GPP supporting NTN should reliably know the location information of a UE attached to the network, in order to select an appropriate CN for that UE. Once the appropriate CN has been selected for the UE, it is then possible to support some services subject to national regulations or other operational constraints.

The following four services have been identified in NTN Rel-18 work item:
1. public warning system (PWS)
2. lawful interception (LI)
3. emergency services (EMS)
4. charging and tariff notifications In 3GPP TR 22.926, it has been set forth that in order to support regulated services and features (e.g., PWS, charging and billing, emergency calls, LI, rata retention policy in cross-border scenarios and international regions, network access), 3GPP networks should have the capability to locate each UE in a reliable manner and determine the policy that applies to their operation depending on their location and/or context.

Any operations addressing extraterritorial use cases, such as international maritime zones and aeronautical cases, should provide a mechanism to notify a home PLMN (HPLMN) on roaming in and out of those areas, including scenarios in which a serving PLMN has not changed. However, as described above, relying only on GNSS based location information reported by the UE is not considered reliable.

Location information reported by a UE (e.g., determined with GNSS receiver) may be incorrect, either intentionally (as described above, e.g., maliciously tampering by a user or by a 3rd party) or unintentionally (e.g., incorrect due to signal interference). Therefore, according to a recent Rel-18 NTN work item, location information reported by a UE cannot be trusted by network operators.

3GPP has already defined a network based functionality to verify a reported UE location with an ID of a serving cell (e.g., a cell ID) for terrestrial networks. However, as described above, radio cells in cellular NTNs are typically much larger than cells of cellular terrestrial networks and may cover borders between two or more countries. Therefore, such the cell ID information may not be sufficient to identify a country in which the UE is located.

Accordingly, a need exists for mechanisms that combine UE reported GNSS information and network based information for verification of the UE location, in order to improve the reliability of CN selection in NTNs. For example, a UE could report GNSS information to the network. However, the network should verify the GNSS information using other information.

A logical UE location should unambiguously map to the geographical area of the UE physical location. Granularity of such geographical areas should be able to provide network location accuracy comparable to that of terrestrial networks.

In terrestrial networks, verification is based on a cell ID and hence, the targeted granularity is related to cell size. Similar granularity should be considered for NTN. Terrestrial macro cell size can be assumed which are up to 5-10 km diameter.

3GPP Rel-18 NTN also requires that UEs are equipped with GNSS devices for estimating their own locations.

However, in some locations, a GNSS signal may be very weak and below a required noise margin, such that a reported UE location determined by its GNSS receiver may not be accurate. As another possible problem, the UE location information may be maliciously tampered by the UE itself or by a 3rd party.

For the above reasons, 3GPP Rel-18 requires mechanism for UE location verifications by the network which does not rely on the reported information by the UE using the GNSS positioning system.

Accordingly, systems and methods are described herein for network verified UE location.

Multiple Satellite

In most NTN scenarios, although a UE communicates with only one satellite as a target satellite, there may be multiple satellites in range of the UE elevation and visibility, such that the UE may receive signals from those satellites too.

In view of the foregoing, mechanisms for network verified UE location are provided where multiple satellites are available for UE measurements.

UE-Assisted UE Location Verification

A network broadcasts a satellite's ephemeris and a real time difference between the satellite's reference point and reference points of its neighboring satellites. These different pieces of information may be broadcast in system information, e.g., in a system information block (SIB). For a synchronized network, the real time differences between the satellite's reference point and its neighboring satellites should be zero, and therefore, they do not need to be broadcast.

A UE may receive the satellite's ephemeris and the real time differences between the satellite's reference point and the reference points of its neighboring satellites from several satellites including a target satellite and its neighboring satellites.

A UE measurement for positioning may be based on a DL RSTD or DL-PRS-reference signal received power (RSRP) measurements.

According to an embodiment, a UE may monitor and decode system information received from multiple satellites (which belong to the same NTN) and measure a relative RSTD between some pairs of those satellites using a system frame number (SFN) value that is broadcast in system information, e.g., a master information block (MIB). The UE is configured with a target satellite and two or more other satellites as neighboring satellites. The RSTD is the relative timing difference between the target cell t and the neighboring cell i, as defined in Equation (1).

$$RSTD_{t,i} = T^t_{subframeRx} - T^i_{subframeRx},\qquad(1)$$

In Equation (1), $$T^t_{subframeRx}$$

is a time when the UE receives a start of one subframe from target satellite t, and $$T^i_{subframeRx}$$

is a time when the UE receives a corresponding start of one subframe from the neighboring satellite i.

FIG. 1 is a flow chart illustrating a UE location report method using system subframe timing of several satellites, according to an embodiment.

Referring to FIG. 1, in step 101, the UE receives satellites' ephemeris. The satellites belong to the same NTN.

In step 103, the UE receives time differences between a satellite's reference point and reference points of neighboring satellites.

In step 105, the UE is configured with its target satellite and neighboring satellites.

Based on information that an LMF has from a network, the LMF configures the UE to receive a reference signal, e.g., a DL-PRS, from multiple satellites, one of which is the target satellite and the others are neighboring satellites. For example, in a multiple-satellite scenario there are multiple satellites in the UE's view. The UE communicates with a network through one satellite at a time, which is referred to as the target satellite. Other satellites in the view of the UE are referred to neighboring satellites.

In step 107, the UE is configured with measuring RSTD using an SFN, which is broadcast by a network in system information.

In step 109, the UE measures RSTDs, e.g., using Equation (1) above, and estimates the UE location using the measured RSTDs.

In step 111, the UE receives, from the network, a command to report the estimated UE location.

In step 113, the UE reports the estimated UE location (and possibly a time stamp) to the network.

Thereafter, steps 109 to 113 may be repeated, e.g., a predetermined number of times.

According to an embodiment, the UE may be configured to receive DL-PRS from multiple satellites (which belong to the same NTN) and measure the relative RSTD between some pairs of those satellites using the arrival time of the received DL-PRS from different satellites. The network may configure the UE to receive DL-PRS in system information, e.g., in an SIB, or may configure the UE to receive DL-PRS in other physical channel containers, e.g., a physical DL shared channel (PDSCH), periodically or intermittently.

Similar to the embodiment illustrated in FIG. 1, the UE may be configured with a target satellite and two or more other neighboring satellites. Here, the RSTD is the relative timing difference between the target cell t and the neighboring cell i, as shown in Equation (2).

$$RSTD_{t,i} = T^t_{DL-PRS} - T^i_{DL-PRS}\qquad(2)$$

In Equation (2), $$T^t_{DL-PRS}$$

is a time when the UE receives a start of DL-PRS from the target satellite t, and $$T^i_{DL-PRS}$$

is a time when the UE receives a corresponding start of DL-PRS from the neighboring satellite i.

Figure 2:
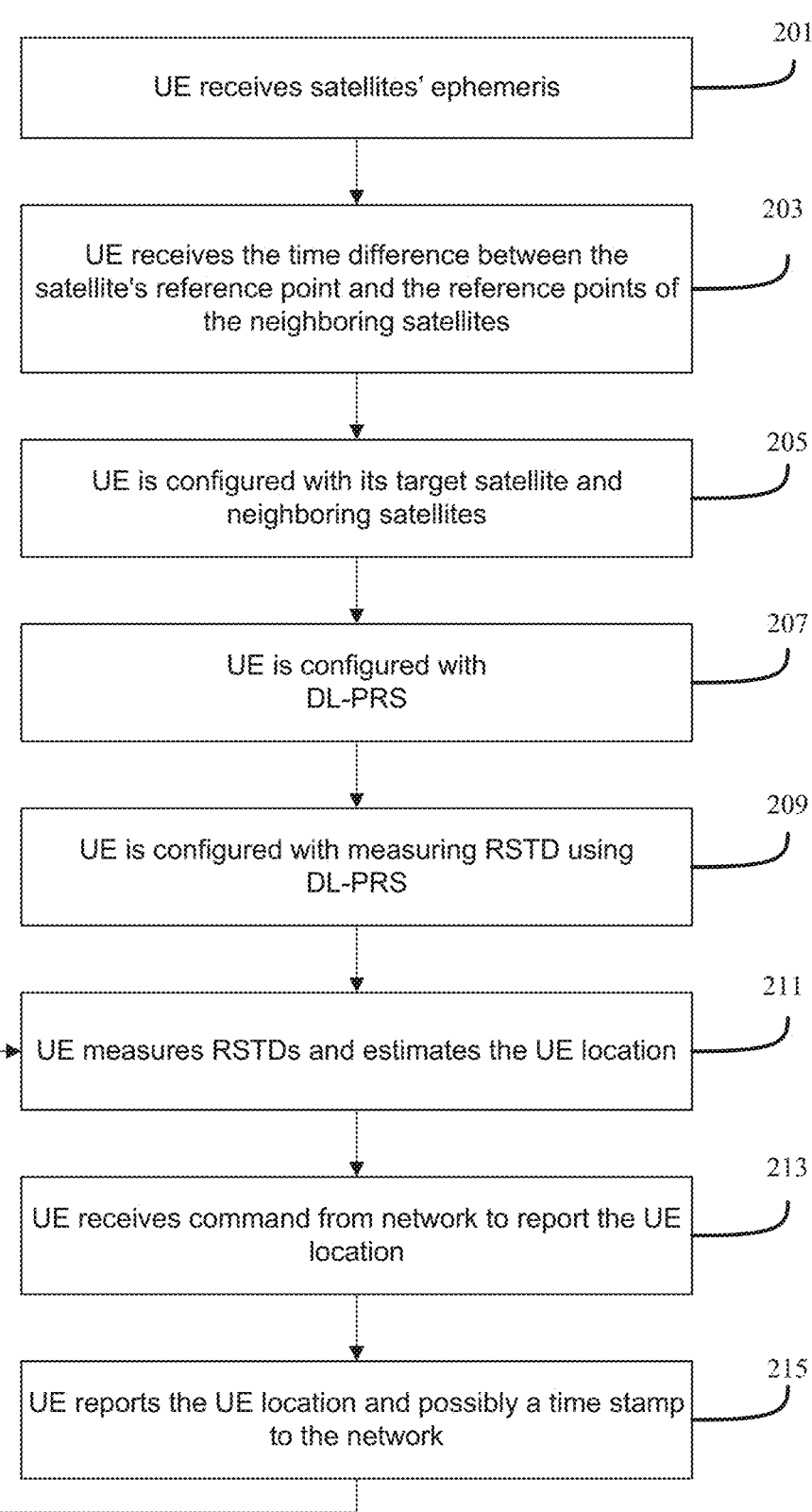
FIG. 2 is a flow chart illustrating a UE location report method using downlink (DL)-positioning reference signal (PRS) measurements from different satellites, according to an embodiment.

FIG. 2 is a flow chart illustrating a UE location report method using DL-PRS measurements from different satellites, according to an embodiment.

Referring to FIG. 2, in step 201, the UE receives satellites' ephemeris. The satellites belong to the same NTN.

In step 203, the UE receives time differences between a satellite's reference point and reference points of neighboring satellites.

In step 205, the UE is configured with its target satellite and neighboring satellites. As described above, the LMF may configure the UE to receive a reference signal, e.g., a DL-PRS, from multiple satellites, one of which is the target satellite and the others are neighboring satellites.

In step 207, the UE is configured with DL-PRS, which is broadcast by a network in system information.

In step 209, the UE is configured by the network to measure RSTD using the DL-PRS.

In step 211, the UE measures RSTDs, e.g., using Equation (2) above, and estimates the UE location using the measured RSTDs.

In step 213, the UE receives, from the network, a command to report the estimated UE location.

In step 215, the UE reports the estimated UE location (and possibly a time stamp) to the network.

Thereafter, steps 211 to 215 may be repeated, e.g., a predetermined number of times.

According to an embodiment, the UE may calculate $RSTD_{t,i}$ using comparisons between received powers of positioning signals (e.g., DL-PRS-RSRP) received from a target satellite and other neighboring satellites.

For example, the UE may estimate a propagation delay from the target and neighboring satellites by measuring DL-PRS-RSRP and using a suitable free space path loss (FSPL) equation. For example, FSPL in decibels (dBs) for a separation distance d in meters and frequency $f_c$ in gigahertz (GHz) may be determined by $FSPL(d,f_c)=32.45+20 \log_{10}(f_c)+20 \log_{10}(d)$. The UE should have knowledge of a target and neighboring satellites' transmit powers.

The operations illustrated in FIG. 2 may also be used to calculate $RSTD_{t,i}$ using comparisons between powers of positioning signals received from a target satellite and other neighboring satellites.

RSTD measurement is possible on an intra-frequency cell and on an inter-frequency cell. An intra-frequency RSTD measurement may be performed when both a target cell and a neighbor cell are on the same carrier frequency. An inter-frequency RSTD measurement may be performed when the target cell and the neighbor cell are on different carrier frequencies.

Time of arrival (ToA) measurements performed by a UE are related to a geometric distance between the UE and a satellite reference point. Herein, without a loss of generality, it is assumed that the satellite reference point is the satellite itself.

In a 3 dimensional (3D) Cartesian coordinate system, e.g., in an Earth-centered, Earth-fixed (ECEF) coordinate system, coordinates of a target satellite t are denoted as $[x_t,y_t,z_t]$, coordinates of neighboring satellite i are denoted as $[x_i,y_i,z_i]$, and coordinates of the UE are denoted as $[x_u,y_u,z_u]$ RSTD measurements may be defined as a time difference between a target satellite and a neighboring satellite, and therefore, corresponds to Equation (3).

$$RSTD_{t,i} = \sqrt{(x_u - x_t)^2 (y_u - y_t)^2 + (z_u - z_t)^2} \Big/ c - \quad (3)$$

-continued
$$\sqrt{(x_u - x_i)^2 + (y_u - y_i)^2 + (z_u - z_i)^2} \Big/ c + (T_t - T_i) + (n_t - n_i)$$

In Equation (3), $RSTD_{t,i}$ is a time difference between the target satellite t and the neighboring satellite i measured at the UE, $(T_t-T_i)$ is a transmit time offset between the two satellites, which may be referred to as the real time difference, $n_t$ and $n_i$ are ToA measurement errors by the UE, and c is the speed of light.

If the coordinates of the target satellite and neighboring satellites antennas (calculated and estimated from satellite's ephemeris) as well as the transmit time offsets $(T_t-T_i)$ are known, at least three neighboring cell measurements i=1, 2, 3 are used, which yields three equations with three unknowns $[x_u,y_u,z_u]$. There may be more than three neighbor cell measurements, in which case the system of equations can be solved by least-squares or weighted-least-squares techniques. The transmit time offsets $(T_t-T_i)$ is zero in a synchronized network.

Figure 3:
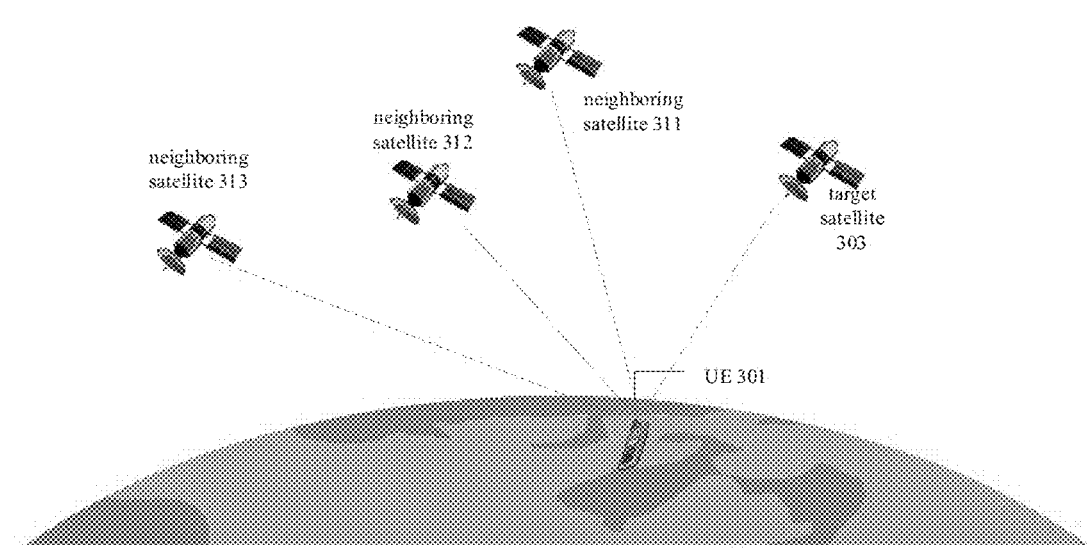
FIG. 3 illustrates a UE configured to measure reference signal time differences (RSTDs) between a target satellite and three neighboring satellites, according to an embodiment.

FIG. 3 illustrates a UE configured to measure RSTD between a target satellite and three neighboring satellites, according to an embodiment.

Referring to FIG. 3, a UE 301 receives signals from a target satellite 303, and three neighboring satellites 311, 312, and 313.

The coordinates of the UE 301 and satellites 303 and 311-313 can be expressed in the ECEF coordinate system. Assuming that the UE 301 is located on the face of the Earth or similarly, that the height of the UE 301 from Earth's surface is known, then Equation (4) may be defined.

$$R_E + h_u = \sqrt{x_u^2 + y_u^2 + z_u^2} \quad (4)$$

In Equation (4), $R_E$ is the radius of Earth and $h_u$ is the UE's height.

Using Equation (4), at least three neighboring cell measurements are used, which yields three equations with three unknowns $[x_u,y_u,z_u]$. However, in practical scenarios for an NR NTN, the height of the UE 301 is negligible compared to the heights of the target satellite 303 and the neighboring satellites 311-313. Accordingly, even if the height of the UE 301 is unknown, this may be ignored in the calculations above. That is, it may be assumed that $h_u$ =O. Accordingly, having two neighboring cell measurements (i=1, 2) may yield satisfactory results for the UE's location with tolerable estimation error.

The UE 301 may receive a MAC control element (CE) command from the network, which may be transmitted on a PDSCH, to report its location information to the network. The UE 301 then sends a location report to the network using the MAC CE, which may be transmitted on a physical uplink shared channel (PUSCH).

The network may also ask the UE 301 to explicitly send a time stamp alongside with the location information to clarify the measurements for the location estimation have been performed at what instant of time. The time stamp may also be implicitly resolvable by the network. In this case, the UE 301 does not need to report it in the MAC CE with the location information.

The UE's location information may be formatted in the ECEF $[x_u,y_u,z_u]$ format, or it could be converted in the form of longitude and latitude format.

Network-Based UE Location Verification

In network-based UE location verification, a UE sends RSTD measurements to the network, based upon a MAC CE command received from the network. The UE configuration may be similar to the above-described embodiments, except that the UE is configured to report RSTD measurements, as opposed to estimated UE location, to the network. The calculations for the UE location are then performed in the network.

Figure 4:
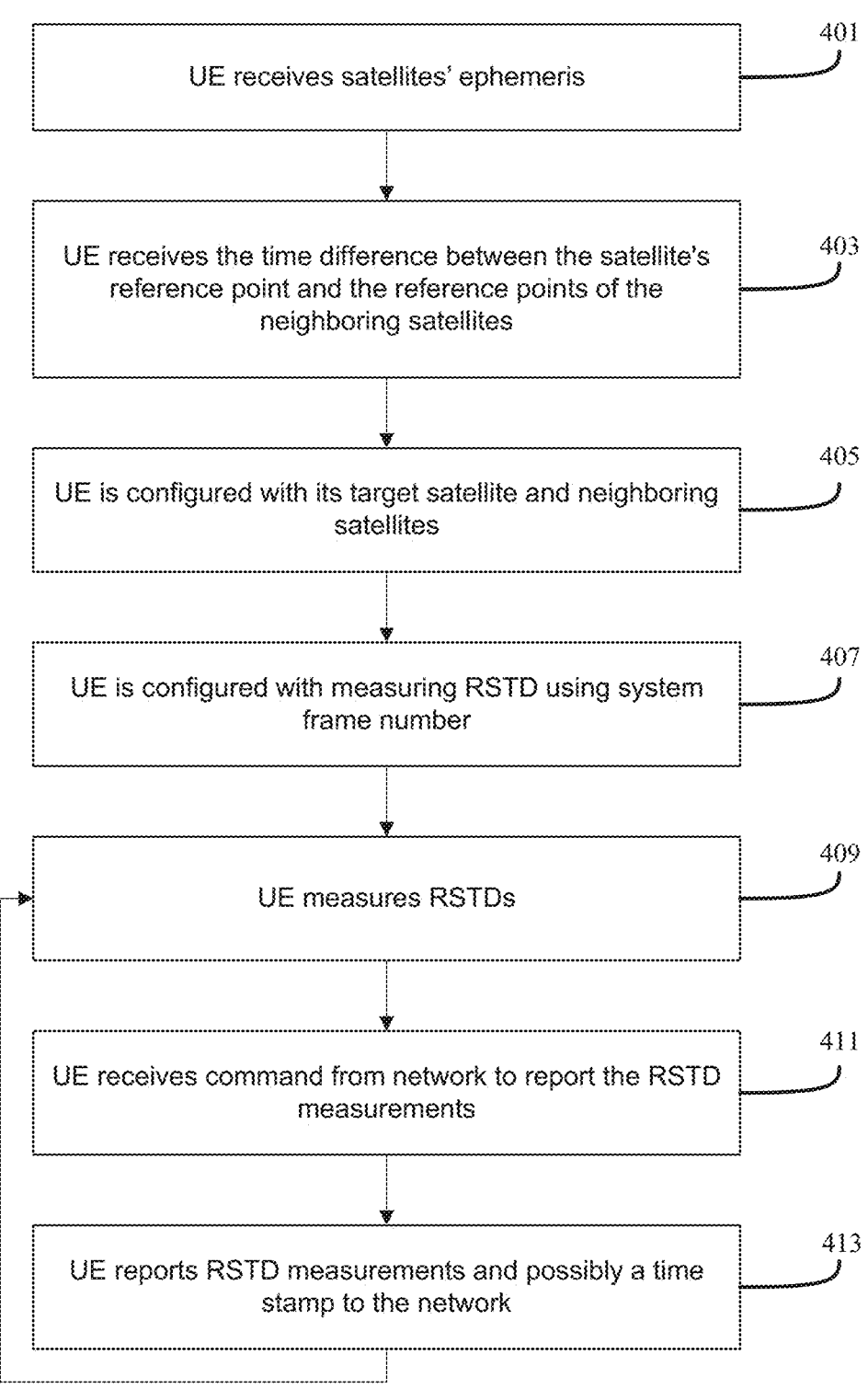
FIG. 4 is a flow chart illustrating RSTD measurement reporting by a UE using system subframe timing of several satellites, according to an embodiment.

FIG. 4 is a flow chart illustrating RSTD measurement reporting by a UE using system subframe timing of several satellites, according to an embodiment.

Referring to FIG. 4, in step 401, the UE receives satellites' ephemeris. The satellites belong to the same NTN.

In step 403, the UE receives time differences between a satellite's reference point and reference points of neighboring satellites.

In step 405, the UE is configured with its target satellite and neighboring satellites. As described above, the LMF may configure the UE to receive a reference signal, e.g., a DL-PRS, from multiple satellites, one of which is the target satellite and the others are neighboring satellites.

In step 407, the UE is configured with measuring RSTD using an SFN, which is broadcast by a network in system information.

In step 409, the UE measures RSTDs, e.g., using Equation (1) above.

In step 411, the UE receives, from the network, a command to report the RSTD measurements.

In step 413, the UE reports the RSTD measurements (and possibly a time stamp) to the network.

Thereafter, steps 409 to 413 may be repeated, e.g., a predetermined number of times.

As described above, the network calculates the UE's location using the RSTD measurements reported from the UE.

Figure 5:
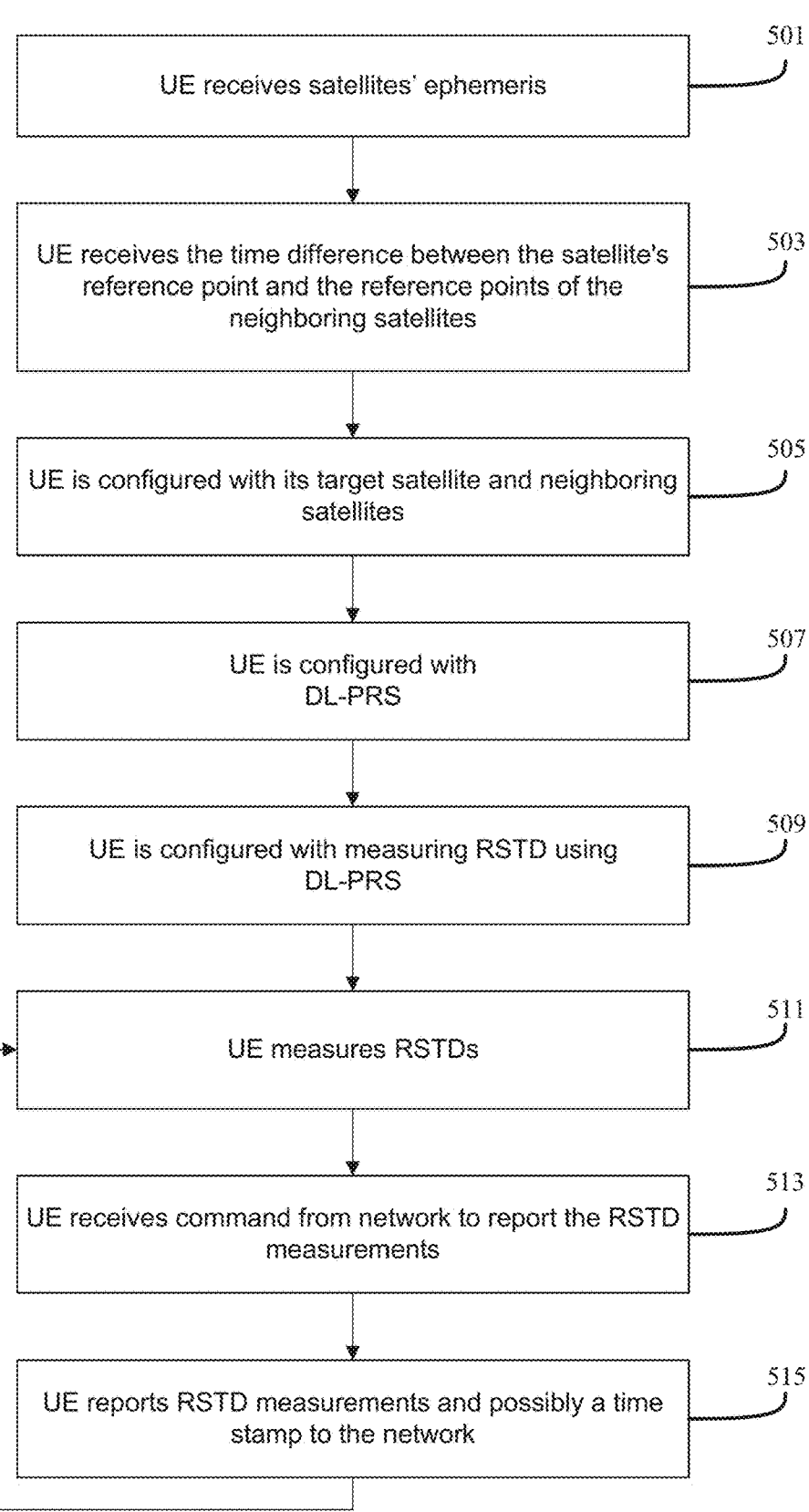
FIG. 5 is a flow chart illustrating RSTD measurement reporting by a UE using DL-PRS measurements from different satellites, according to an embodiment.

FIG. 5 is a flow chart illustrating RSTD measurement reporting by a UE using DL-PRS measurements from different satellites, according to an embodiment.

Referring to FIG. 5, in step 501, the UE receives satellites' ephemeris. The satellites belong to the same NTN.

In step 503, the UE receives time differences between a satellite's reference point and reference points of neighboring satellites.

In step 505, the UE is configured with its target satellite and neighboring satellites. As described above, the LMF may configure the UE to receive a reference signal, e.g., a DL-PRS, from multiple satellites, one of which is the target satellite and the others are neighboring satellites.

In step 507, the UE is configured with DL-PRS, which is broadcast by a network in system information.

In step 509, the UE is configured by the network to measure RSTD using the DL-PRS.

In step 511, the UE measures RSTDs, e.g., using Equation (2) above.

In step 513, the UE receives, from the network, a command to report the RSTD measurements.

In step 515, the UE reports the RSTD measurements (and possibly a time stamp) to the network.

Thereafter, steps 511 to 515 may be repeated, e.g., a predetermined number of times.

As described above, the network calculates the UE's location using the RSTD measurements reported from the UE.

Single Satellite

Although various embodiments are described above with reference to multiple satellites, in some scenarios, there may be only one satellite available for location measurement. For example, in low Earth orbit (LEO) or medium Earth orbit (MEO) satellite networks, due to the fast movement of the satellites, there may only be a single satellite in a UE's elevation. In such cases, measurements from several satellites are not available to the UE. However, since the satellite is moving in a predictable trajectory, measurements may be made at different times (herein, referred to as "epoch times") using signals transmitted from the same satellite.

UE-Assisted UE Location Verification

Figure 6:
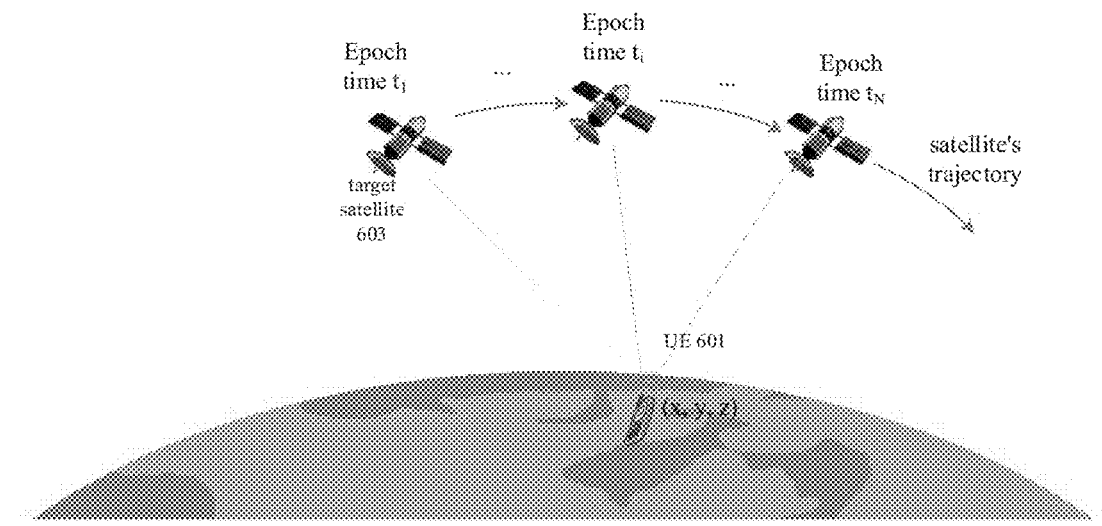
FIG. 6 illustrates a UE configured to measure reference signal time differences (RSTDs) from one satellite at different times, according to an embodiment.

FIG. 6 illustrates a UE configured to measure reference signal time differences (RSTDs) from one satellite at different times, according to an embodiment.

Referring to FIG. 6, a single satellite 603 passes above a UE 601, and the UE 601 makes measurements in epoch times $t_1, \ldots, t_i, \ldots, t_N$.

According to an embodiment, the UE 601 may be configured to receive DL-PRS from the single satellite 603 at multiple epoch times and measure the relative RSTD between some pairs of those epoch times using the arrival times of the received DL-PRSs. A network may configure the UE 601 to receive a DL-PRS in system information, e.g., in a SIB, or may configure the UE 601 to receive DL-PRSs in other physical channel containers, e.g., a PDSCH, periodically or intermittently. As described above, the UE 601 has knowledge of the satellite's location by receiving ephemeris date from the network. An RSTD is a relative timing difference between epoch time $t_i$ and epoch time $t_j$, as shown in Equation (5).

$$RSTD_{t_i, t_j} = T_{DL-PRS}^{t_i} - T_{DL-PRS}^{t_j} \tag{5}$$

In Equation (5), $$T_{DL-PRS}^{t_i}$$

is a time when the UE 601 receives a start of a DL-PRS corresponding to epoch time $t_i$, and $$T_{DL-PRS}^{t_j}$$

is a time when the UE 601 receives a start of a DL-PRS corresponding to epoch time $t_j$.

Figure 7:
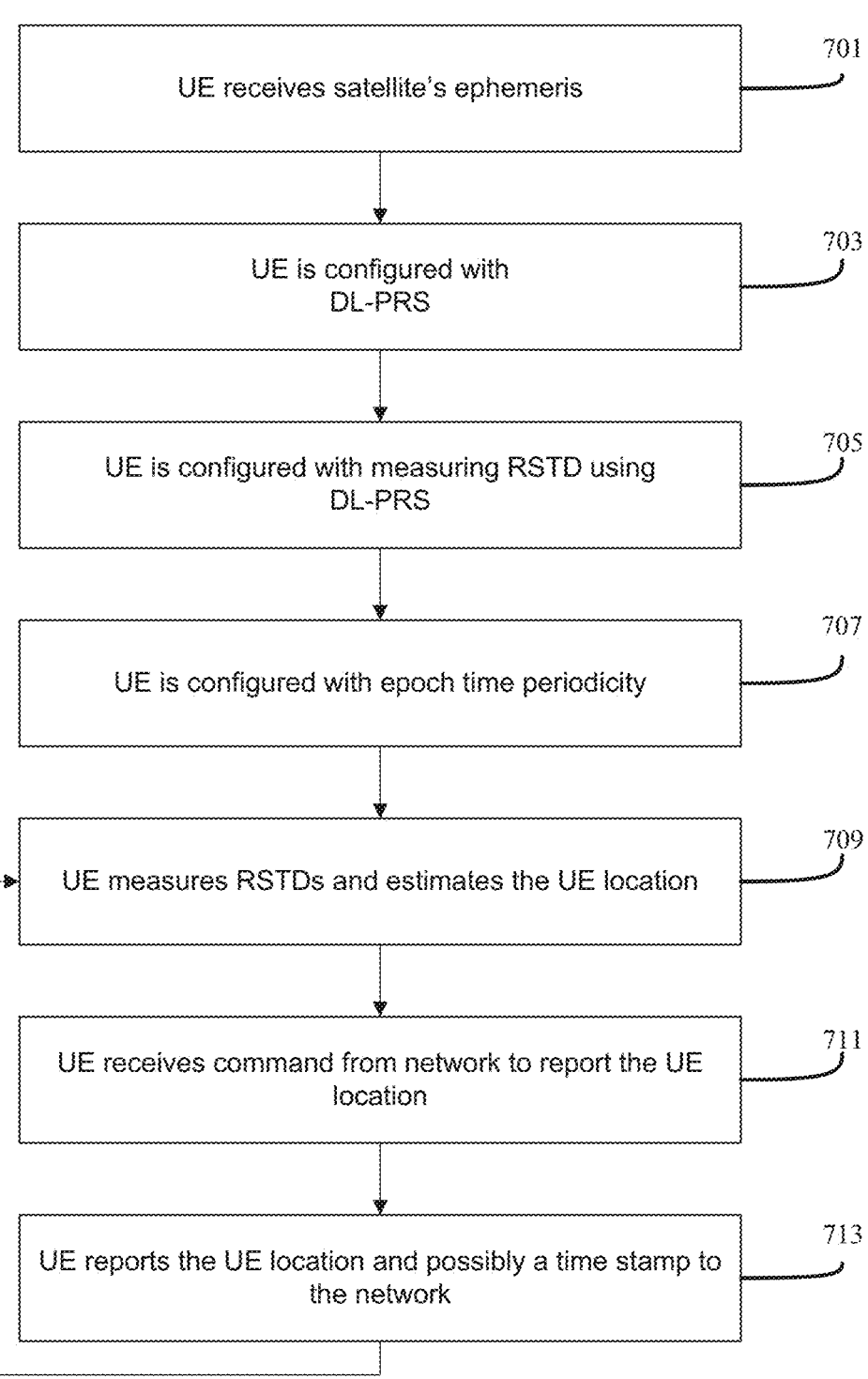
FIG. 7 is a flow chart illustrating a UE location report method using DL-PRS measurement from single satellite at different epoch times, according to an embodiment.

FIG. 7 is a flow chart illustrating a UE location report method using DL-PRS measurement from single satellite at different epoch times, according to an embodiment.

Referring to FIG. 7, in step 701, the UE receives a satellite's ephemeris.

In step 703, the UE is configured with DL-PRS, which is broadcast by a network in system information.

In step 705, the UE is configured by the network to measure RSTD using the DL-PRS.

In step 707, the UE is configured with an epoch time periodicity. For example, for single satellite measurements, the epoch time periodicity may be between 10 to 20 seconds.

In step 709, the UE measures RSTDs based on the epoch time periodicity, and estimates the UE location using the measured RSTDs.

In step 711, the UE receives, from the network, a command to report the estimated UE location.

In step 713, the UE reports the estimated UE location (and possibly a time stamp) to the network.

Thereafter, steps 709 to 713 may be repeated, e.g., a predetermined number of times.

According to an embodiment, a UE may calculate $RSTD_{t_i, t_j}$ using a comparison between received powers of positioning signals (e.g., DL-PRS-RSRPs) received from a single satellite at different epoch times. The UE may estimate a propagation delay from the single satellite by measuring DL-PRS-RSRP at different epoch times and using a FSPL equation. The UE should have knowledge of the satellite's transmit power.

The UE may receive a MAC CE command from the network, which may be transmitted on a PDSCH, to report its location information to the network. In response, the UE sends a location report to the network using the MAC CE that may be transmitted on a PUSCH.

The network may also ask the UE to explicitly send a time stamp alongside with the location information in order to clarify that measurements for the location estimation have been performed at what instant of time. The time stamp may also be resolvable by the network implicitly. In such a case, the UE does not need to report it in the MAC CE with the location information.

As described above, the UE's location information may be formatted in the ECEF $[x_u, y_u, z_u]$ format, or it could be converted in the form of longitude and latitude format.

Network-Based UE Location Verification

1. Location Verification Using RSTD Measurements

In network-based UE location verification, a UE may send RSTD measurements to the network based upon a MAC CE command received from the network. The UE configuration may be done similar to the UE-assisted solution above, but the UE is configured to report RSTD measurements, as opposed to reporting the UE location, to the network. The calculations for the UE location are then performed by the network.

8 is a flow chart illustrating RSTD measurement reporting by a UE using DL-PRS measurements from a single satellite at different epoch times, according to an embodiment.

Figure 8:
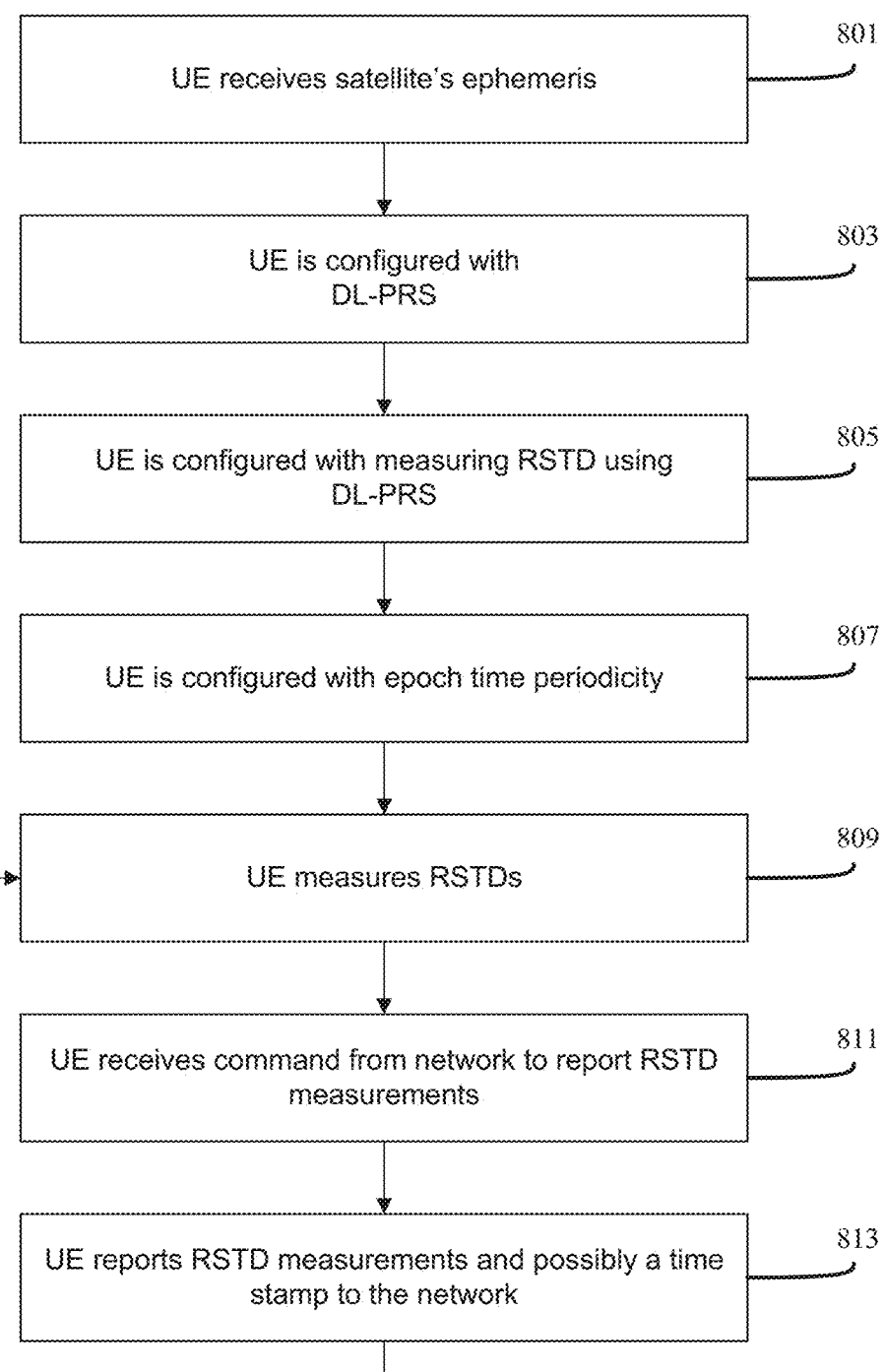
FIG. 8 is a flow chart illustrating RSTD measurement reporting by a UE using DL-PRS measurements from a single satellite at different epoch times, according to an embodiment.

Referring to FIG. 8, in step 801, the UE receives a satellite's ephemeris.

In step 803, the UE is configured with DL-PRS, which is broadcast by a network in system information.

In step 805, the UE is configured by the network to measure RSTD using the DL-PRS.

In step 807, the UE is configured with an epoch time periodicity. For example, the epoch time periodicity may be between 10 to 20 seconds.

In step 809, the UE measures RSTDs based on the epoch time periodicity.

In step 811, the UE receives, from the network, a command to report the RSTD measurements.

In step 813, the UE reports the RSTD measurements (and possibly a time stamp) to the network.

Thereafter, steps 809 to 813 may be repeated, e.g., a predetermined number of times.

As described above, the network calculates the UE's location using the RSTD measurements reported from the UE.

2. Location Verification Using Doppler Frequency Measurements

As illustrated in FIG. 6, a location of the UE may be denoted as $P_T = [x,y,z]^T$, wherein T in the superscript of the vector $[x,y,z]$ denotes a transpose of the vector. If the measurements are performed in a relatively short time, i.e., a short epoch time periodicity is used, such as 5 seconds, the movement of the UE can be ignored during the measurements and it can be assumed that the UE is stationary. As described above, it can also be assumed that the elevation of the UE can be ignored.

When a satellite is passing over a target area, a position vector, a velocity vector, and an acceleration vector of the satellite at a time $t_i$ may be denoted by Equation (6).

$$P_{si} = [x_{si}, y_{si}, z_{si}]^T, \quad V_{si} = [v_{xi}, v_{yi}, v_{zi}]^T, \quad A_{si} = [a_{xi}, a_{yi}, a_{zi}]^T \quad (6)$$

In Equation (6), $P_{si}$ is the position vector, $V_{si}$ is the velocity vector, and $A_{si}$ is the acceleration vector.

The radial velocity of the satellite relative to the UE at time $t_i$ can be denoted as shown in Equation (7).

$$v_{ri} = \frac{P_i^T V_i}{|P_i|} \quad (7)$$

16 In Equation (7), $P_i = P_T - P_{si}$ denotes the relative position vector between the UE and the satellite. $|P_i|$ denotes a distance between the UE and the satellite. $V_i = -V_{si}$ denotes a relative velocity vector.

The radial velocity in Equation (7), can also be written as shown in in Equation (8).

$$v_{ri} = -\frac{v_{xi}(x - x_{si}) + v_{yi}(y - y_{si}) + v_{zi}(z - z_{si})}{\sqrt{(x - x_{si})^2 + (y - y_{si})^2 + (z - z_{si})^2}} \quad (8)$$

The frequency of the received signal at time $t_i$ contains a Doppler frequency, which is modulated by a relative radial velocity as shown in Equation (8).

$$f_{di} = f_0 \cdot \left(1 - \frac{v_{ri}}{c}\right) \quad (9)$$

In Equation (9), $f_o$ denotes the carrier frequency and c denotes the speed of light.

A UE can measure a received signal Doppler frequency at the epoch times $t_1, \ldots, t_i, \ldots, t_N$, and send the measurement results to the network (e.g., a gNB or an LMF).

The network may receive N observations of a Doppler frequency, which can be described as N dimensional equations, as shown in Equation (10).

$$\begin{bmatrix} f_{d1} \\ f_{d2} \\ \vdots \\ f_{dN} \end{bmatrix} = \begin{bmatrix} f_{1(x,y,z)} \\ f_{2(x,y,z)} \\ \vdots \\ f_{N(x,y,z)} \end{bmatrix} \quad (10)$$

Assuming that the UE is located on the surface of the Earth, its position in geocentric Cartesian coordinate system, i.e., $[x,y,z]$, can be obtained by solving N dimensional equations in (10).

Alternatively, a radial acceleration $a_{ri}$ can be derived by taking a derivative of equation (8), as shown below in Equation (11).

$$a_{ri} = \frac{dv_{ri}}{dt} = \frac{v_{xi}^2 + v_{yi}^2 + v_{zi}^2}{\sqrt{(x - x_{si})^2 + (y - y_{si})^2 + (z - z_{si})^2}} - \tag{11}$$

$$\frac{a_{xi}(x - x_{si}) + a_{yi}(y - y_{si}) + a_{zi}(z - z_{si})}{\sqrt{(x - x_{si})^2 + (y - y_{si})^2 + (z - z_{si})^2}} +$$

$$\frac{(v_{xi}(x - x_{si}) + v_{yi}(y - y_{si}) + v_{zi}(z - z_{si}))^2}{\left(\sqrt{(x - x_{si})^2 + (y - y_{si})^2 + (z - z_{si})^2}\right)^3}$$

Using Equation (9), a Doppler frequency rate-of-change may be calculated using Equation (12).

$$f_{di}' = \frac{df_{di}}{dt} = -\frac{f_0}{c} a_{ri} \tag{12}$$

Similar to the above-described embodiments, a UE can measure a received signal Doppler frequency rate-of-change at the epoch times $t_1, \ldots, t_i, \ldots, t_N$, and send the measurement results to the network (e.g., a gNB or an LMF).

Network receives N observations of Doppler frequency rate-of-change, which can be described as N dimensional equations, as shown in Equation (13)

$$\begin{bmatrix} f_{d1}' \\ f_{d2}' \\ \vdots \\ f_{dN}' \end{bmatrix} = \begin{bmatrix} f_{1(x,y,z)} \\ f_{2(x,y,z)} \\ \vdots \\ f_{N(x,y,z)} \end{bmatrix} \tag{13}$$

Assuming that the UE is located on the surface of the Earth, its position in geocentric Cartesian coordinate system can be obtained by solving N dimensional equations in (13). Therefore, UE location information can also be obtained by measuring Doppler information at different times.

For the above scenario, a UE may be configured to measure Doppler frequency or a Doppler frequency rate-of-change of a received signal from a single satellite at multiple epoch times. The network may configure the UE by RRC signaling. In order to perform accurate frequency measurements, the UE should have a stable reference frequency source, that is not obtained from the satellite, since the satellite motion will create Doppler shift. For example, such a frequency source can be obtained from a GNSS.

Also, Doppler can be affected by multipath. Accordingly, if desired, measurements can be performed using a first ray only.

The UE may receive a MAC CE command from the network, which may be transmitted on a PDSCH, to report Doppler frequency or a Doppler frequency rate-of-change to the network. In response, the UE may send the Doppler frequency or the Doppler frequency rate-of-change reports to the network using the MAC CE that may be transmitted on a PUSCH.

The network may also ask the UE to explicitly send a time stamps alongside with the Doppler report to clarify the measurements for Doppler have been performed at what instances of time.

The time stamp may also be resolvable by the network implicitly. In such a case, the UE does not need to report it in the MAC CE with Doppler information.

Figure 9:
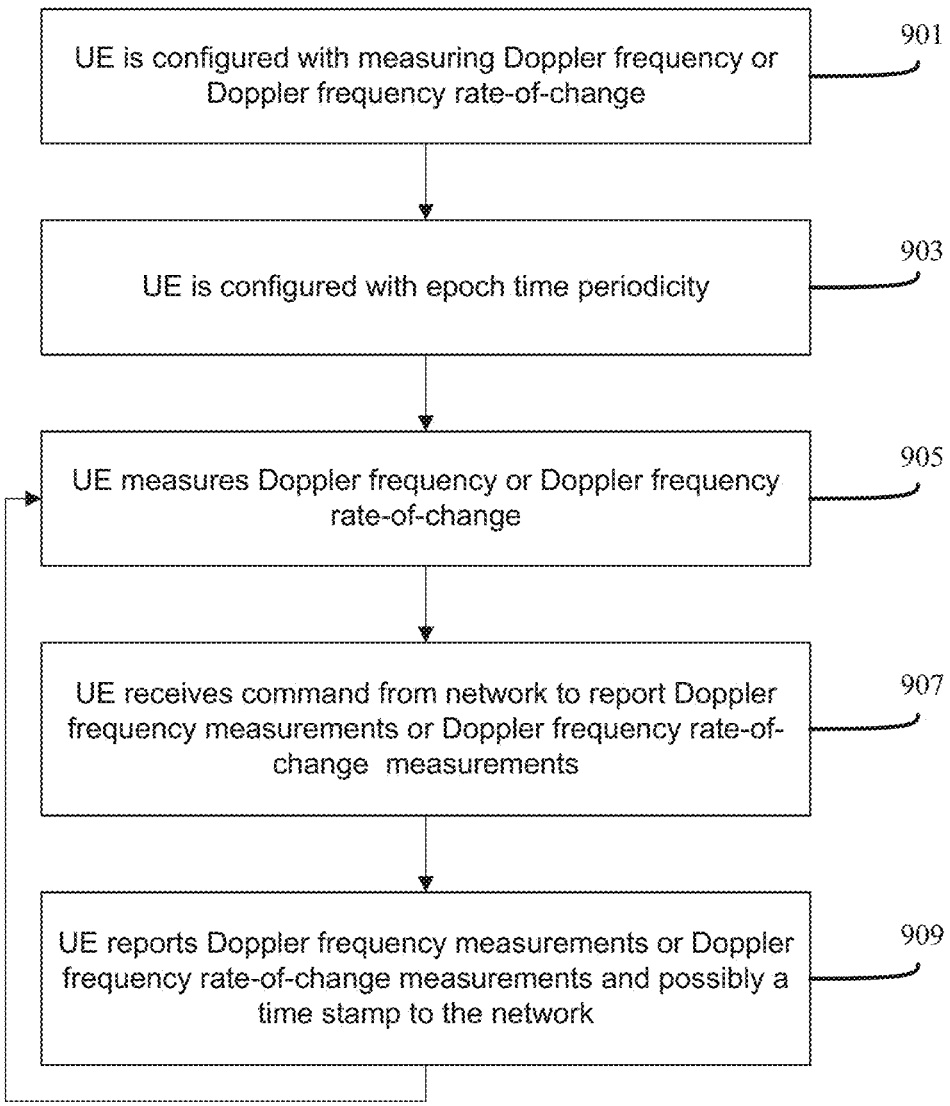
FIG. 9 is a flow chart illustrating Doppler frequency or a Doppler frequency rate-of-change reporting by a UE using Doppler frequency measurement from a single satellite at different epoch times, according to an embodiment.

FIG. 9 is a flow chart illustrating Doppler frequency or a Doppler frequency rate-of-change reporting by a UE using Doppler frequency measurement from a single satellite at different epoch times, according to an embodiment.

Referring to FIG. 9, in step 901, the UE is configured with measuring Doppler frequency or a Doppler frequency rate-of-change.

In step 903, the UE is configured with an epoch time periodicity. For example, the epoch time periodicity may be 5 seconds.

In step 905, the UE measures Doppler frequency or a Doppler frequency rate-of-change based on the epoch time periodicity.

In step 907, the UE receives, from the network, a command to report the measured Doppler frequency or Doppler frequency rate-of-change.

In step 909, the UE reports the measured Doppler frequency or Doppler frequency rate-of-change (and possibly a time stamp) to the network.

Thereafter, steps 905 to 909 may be repeated, e.g., a predetermined number of times.

As described above, the network calculates the UE's location using the Doppler frequency or Doppler frequency rate-of-change measurements reported from the UE.

Hybrid Approach

UE-Assisted UE Location Verification

In a dynamic satellite constellation, such as a LEO or a MEO, the number of the satellites within the range of a UE may vary over time. Depending on a constellation configuration of the satellites in an NTN network and also depending on a geographical location of the UE, the UE may sometimes see multiple satellites in the elevation and see only one or two satellites at other times. For such networks, a hybrid combination of the embodiments described above may work more effectively.

More specifically, a UE may receive ephemeris dates of multiple satellites that a network determines are going to be in the range of the UE for a foreseeable period of time, e.g., 20 minutes. The UE is dynamically configured with a target satellite and neighboring satellite. The UE also receives a time difference between a satellite's reference point and reference points of neighboring satellites. The UE is also configured with an epoch time periodicity for the target satellite (and optionally the neighboring satellites). The UE is configured with receiving DL-PRS from all satellites too. If measurements from multiple satellites are available, then the UE uses a multiple satellite solution. Otherwise, if measurements from only one satellite are available, then UE uses single satellite solution. The UE may also use the combination of the measurements, if both are available.

Figure 10:
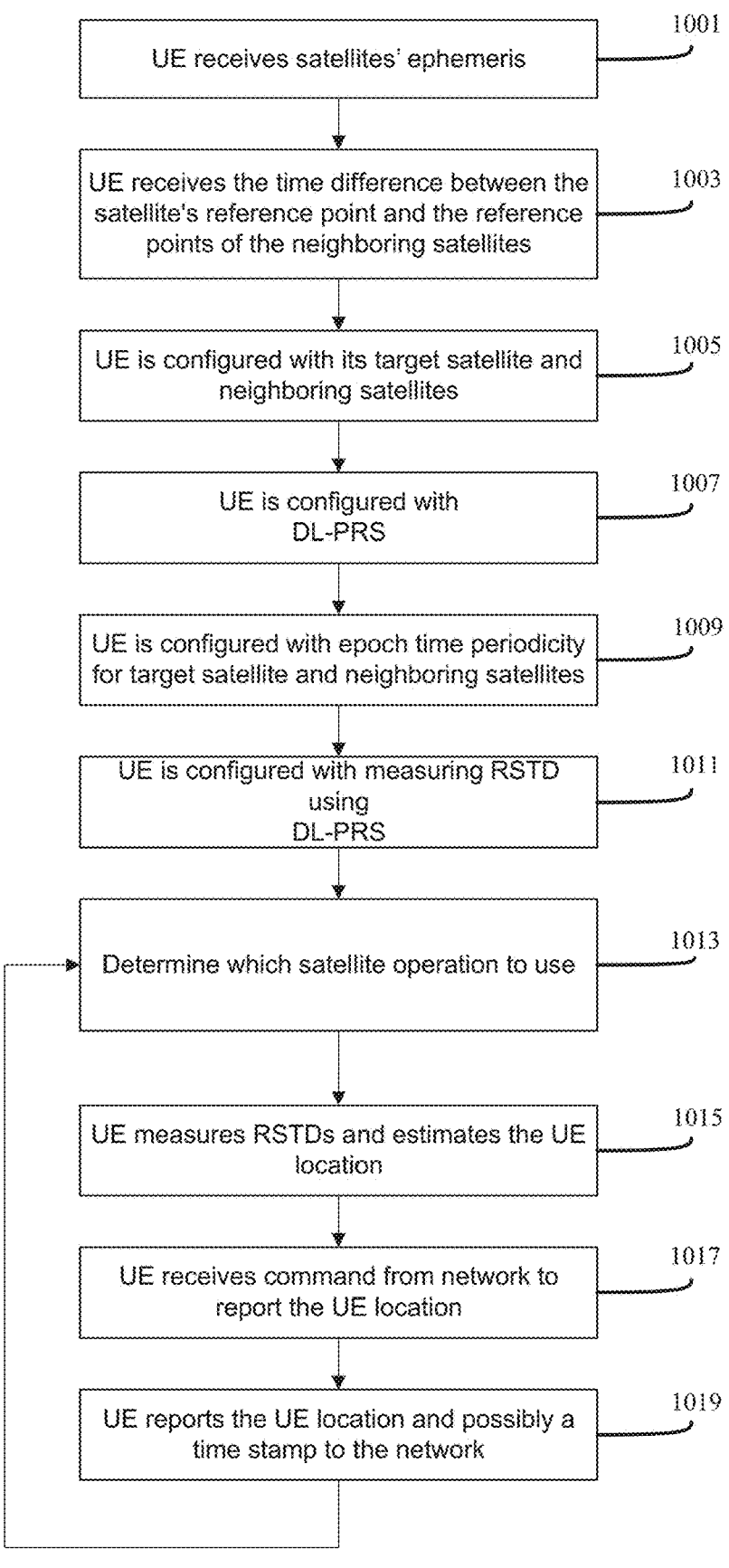
FIG. 10 is a flow chart illustrating a UE location report method using DL-PRS measurement from multiple satellites or a single satellite, according to an embodiment.

FIG. 10 is a flow chart illustrating a UE location report method using DL-PRS measurement from multiple satellites or a single satellite, according to an embodiment.

Referring to FIG. 10, in step 1001, the UE receives satellites' ephemeris. The satellites belong to the same NTN.

In step 1003, the UE receives time differences between a satellite's reference point and reference points of neighboring satellites.

In step 1005, the UE is configured with its target satellite and neighboring satellites.

In step 1007, the UE is configured with DL-PRS, which is broadcast by a network in system information.

In step 1009, the UE is configured with an epoch time periodicity for target satellite and the neighboring satellites. For example, the epoch time periodicity may be 10 to 20 seconds. It is noted that different satellites may have different epoch time periodicities.

In step 1011, the UE is configured with measuring RSTD using DL-PRS.

In step 1013, the UE determines which satellite operation to use. That is, if measurements from multiple satellites are available, the UE may use a multiple satellite operation. If measurements from only one satellite are available, the UE may use a single satellite operation. Additionally, the UE may use a combination of the measurements too, if both are available.

In step 1015, the UE measures RSTDs and estimates the UE location using the measured RSTDs, based on the determined satellite operation.

In step 1017, the UE receives, from the network, a command to report the estimated UE location.

In step 1019, the UE reports the estimated UE location (and possibly a time stamp) to the network.

Thereafter, steps 1013 to 1019 may be repeated, e.g., a predetermined number of times.

To utilize a method as illustrated in FIG. 10, some UE behavior and signaling modifications may be performed.

Generally speaking, for network-based positioning, a network indicates which positioning technique to use. This may be implicitly done, e.g., by requesting a UE to report RSTD measurements.

Hybrid positioning might not always be possible. For example, depending on the visible satellites, a UE may report RSTD measurements only, or may report RSTD and RTT measurements. Additional signaling changes may be required to perform such measurements.

For example, a UE may report which satellites it can report RSTD from, and which satellites it can report RTT from. The network can then configure the measurements accordingly.

A UE may autonomously determine which measurements to do and then indicate the determined measurements to a gNB.

A UE report may include both RTT and RSTD measurements in the same measurement report.

Alternatively, a UE may report its location only, instead of the reports. However, because network-verified positioning may have relatively low accuracy, it cannot always be used. However, if used, it may be beneficial to use which positioning measurements/methods the UE used when indicating its location. The network may then use this information to assess the quality of the positioning report.

Network-Based UE Location Verification

In network-based UE location verification, a UE sends RSTD measurements to a network based upon a MAC CE command from the network. The UE configuration may be done in a similar manner as in the UE-assisted operations described above. However, because the UE is configured to report RSTD measurements instead of a UE location to the network, the calculations for the UE location are performed in the network.

Figure 11:
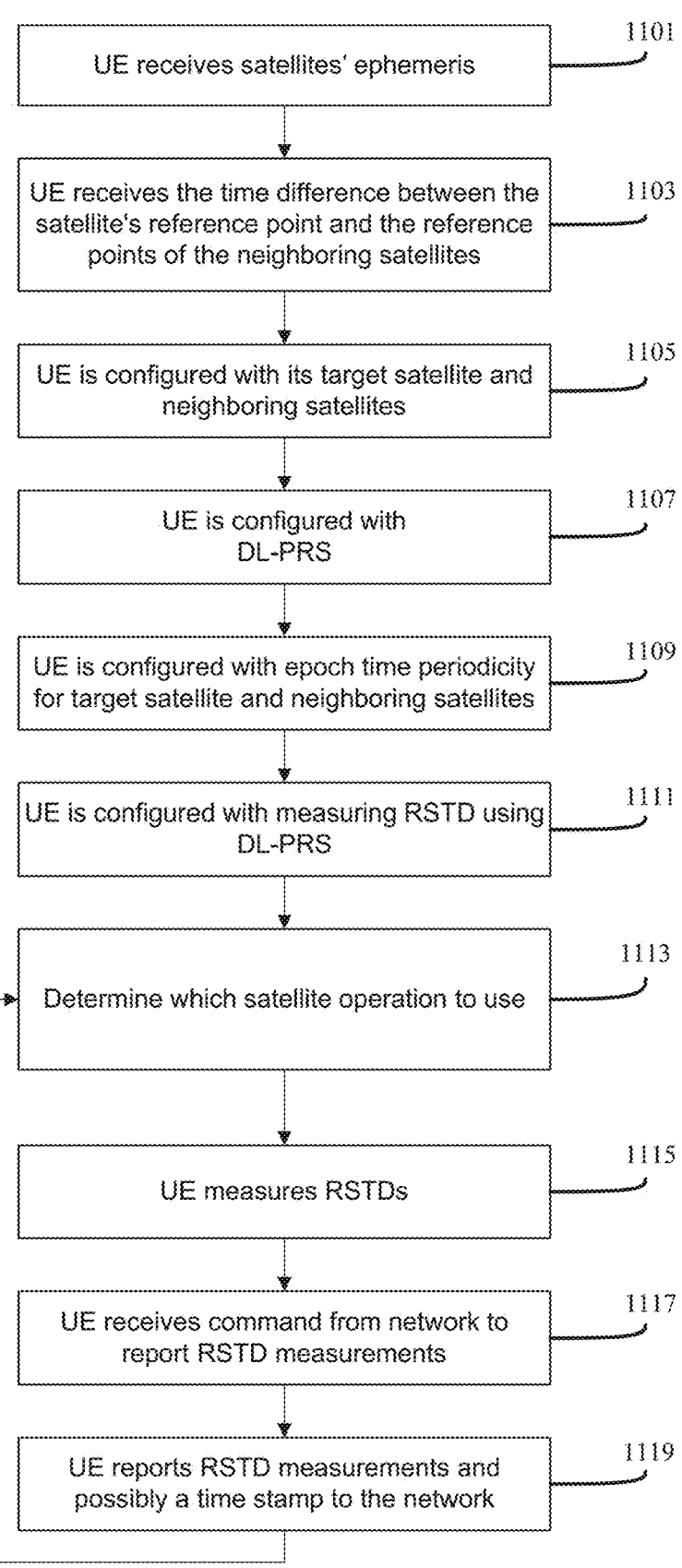
FIG. 11 is a flow chart illustrating RSTD measurement reporting by a UE using DL-PRS measurements from multiple satellites or a single satellite, according to an embodiment.

FIG. 11 is a flow chart illustrating RSTD measurement reporting by a UE using DL-PRS measurements from multiple satellites or a single satellite, according to an embodiment.

Referring to FIG. 11, in step 1101, the UE receives satellites' ephemeris. The satellites belong to the same NTN.

In step 1103, the UE receives time differences between a satellite's reference point and reference points of neighboring satellites.

In step 1105, the UE is configured with its target satellite and neighboring satellites.

In step 1107, the UE is configured with DL-PRS, which is broadcast by a network in system information.

In step 1109, the UE is configured with an epoch time periodicity for target satellite and the neighboring satellites. For example, the epoch time periodicity may be 10 to 20 seconds.

In step 1111, the UE is configured with measuring RSTD using DL-PRS.

In step 1113, the UE determines which satellite operation to use. That is, if measurements from multiple satellites are available, the UE may use a multiple satellite operation. If measurements from only one satellite are available, the UE may use a single satellite operation. Additionally, the UE may use a combination of the measurements too, if both are available.

In step 1115, the UE measures RSTDs based on the determined satellite operation.

In step 1117, the UE receives, from the network, a command to report the RSTD measurements.

In step 1119, the UE reports the RSTD measurements (and possibly a time stamp) to the network.

Thereafter, steps 1113 to 1119 may be repeated, e.g., a predetermined number of times.

As described above, the network calculates the UE's location using the RSTD measurements reported from the UE.

Network Verified Multi-RTT UE Location

As describes above, a concern of using UE location, received from a UE, determined by its GNSS, is that the reported information may be maliciously tampered with by the UE itself or by a 3rd party. That is, the UE could report false location information to a network, e.g., an LMF therein, pretending to be located in a different location in order to possibly connect to a different CN to take advantage of another network. For these types of reasons, positioning methods that do not rely on GNSS are required.

A method that is suitable for NTN network verified UE location is a multi-RTT positioning method. This method fulfills an accuracy requirement of 10 km. The multi-RTT method is also suitable for a single satellite operation, where all RTT measurements are done with the same satellite at different times.

Table 1, for example, shows an accuracy of a single satellite multi-RTT method. In Table 1, "window for measurement" refers to a total time to complete three measurements.

Table 1. Accuracy of Horizontal Position Estimation in Meters, LEO-600

| | | Window for measurement | | | | | | | | |
|---|---|---|---|---|---|---|---|---|---|---|
| | | | 10 s | | | 20 s | | | 40 s | |
| | Percentile | 50th | 95th | 97th | 50th | 95th | 97th | 50th | 95th | 97th |
| Max | 30 ns | 49 | 484 | 861 | 23 | 223 | 372 | 11 | 94 | 166 |
| measurement | 50 ns | 81 | 827 | 1410 | 37 | 344 | 589 | 18 | 139 | 238 |

-continued

| | | Window for measurement | | | | | | | | |
| | | 10 s | | | 20 s | | | 40 s | | |
| | Percentile | 50th | 95th | 97th | 50th | 95th | 97th | 50th | 95th | 97th |
|---|---|---|---|---|---|---|---|---|---|---|
| error | 100 ns | 162 | 1486 | 2345 | 78 | 703 | 1149 | 36 | 312 | 516 |
| | 200 ns | 330 | 3230 | 4881 | 161 | 1360 | 2192 | 72 | 557 | 945 |

Since each RTT measurement is done in a small time duration, typically within a few tens of millisecond, this method is generally not susceptible to measurement errors caused by clock drifts in the satellite and/or in the UE.

Other counterpart time based positioning methods, such as DL-time difference-of-arrival (TDoA) or UL-TDoA, are often susceptible to clock drift. For example, in TDoA methods, for a single satellite operation, measurements have to be performed over a longer time duration (typically 30 to 60 seconds) and therefore, any clock drift will cause measurement errors that degrade positioning accuracy.

A multi-RTT method, however, still relies on measurements reported by a UE to an LMF. Therefore, a malicious UE could still report false measurements on purpose and tamper with the LMF calculations.

According to an embodiment, methods are provided for configuring and reporting measurements by a UE, such that an LMF is able to verify the measurements reported by the UE. If the reported measurements are not verified, the UE can be identified as a malicious UE.

According to an embodiment, RTT measurements are performed based on DL-PRS transmissions from a gNB to a UE and SRS transmissions from the UE to the gNB. An LMF configures both the gNB and the UE for the DL-PRS and SRS transmissions and allocates resources for these transmissions accordingly. The transmit and the receive times of both DL-PRS and SRS are reported to the LMF from the UE and the gNB. The LMF then checks a validity of the reported values and verifies whether or not the reported values are trustworthy. The LMF continues collecting measurement data from both the UE and the gNB, and if measurements are trustworthy, the location of UE is calculated by the LMF.

Figure 12:
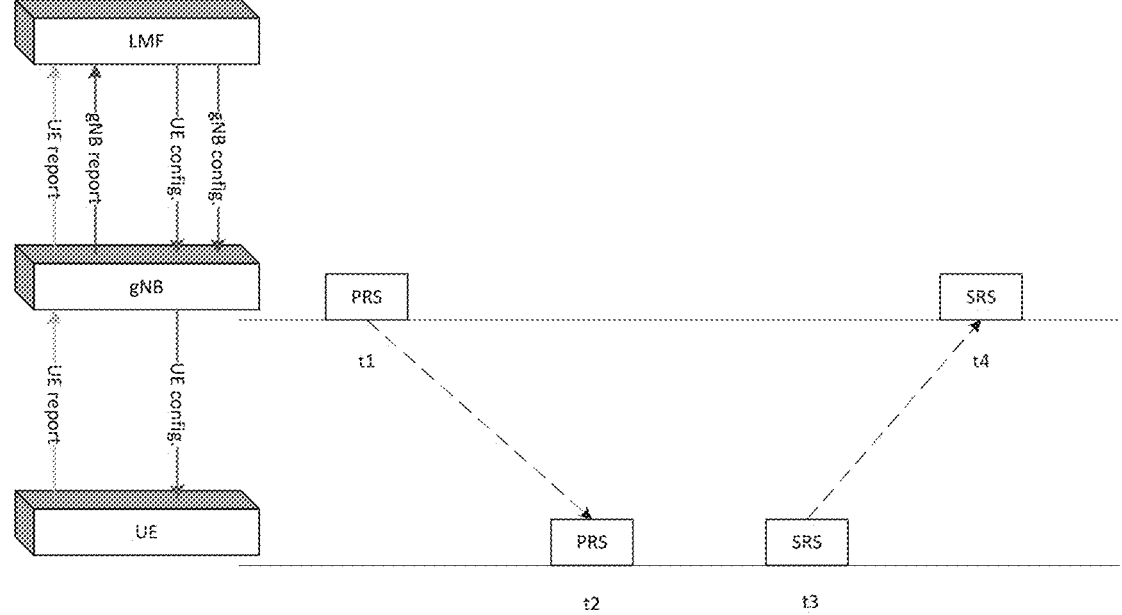
FIG. 12 illustrates an example of DL-PRS and SRS transmissions between a UE and a gNB, according to an embodiment.

FIG. 12 illustrates an example of DL-PRS and SRS transmissions between a UE and a gNB, according to an embodiment.

Referring to FIG. 12, a gNB is configured to transmit a DL-PRS at a resource that is 4 associated with time t1. Similarly a UE is configured to transmit an SRS at a resource that is associated with time t3. In a legacy multi-RTT method, the gNB reports the value of (t4−t1), and the UE reports the value of (t3−t2) to LMF. Thereafter, the LMF calculates RTT using Equation (14).

$$RTT = (t4 - t1) - (t3 - t2) \tag{14}$$

As described above, a malicious UE can report a false value for (t3−t2) and manipulate an LMF to calculate a false location for the UE.

In this embodiment, however, the UE reports the values of t2 and t4 separately to the LMF. That is, the UE report to the LMF includes values of t2 and t4.

Similarly, the gNB reports the values of t2 and t3 separately to LMF. That is, the gNB report to the LMF includes values of t2 and t3.

Based on the foregoing, the LMF receives all four values of t1, t2, t3, and t4, and is able to verify a validity of the reported values t2 and t3 by the UE.

More specifically, since the LMF has configured the UE with a specific resource for SRS transmission, the LMF has a very good approximation of the value of t3 within the value of one slot duration (e.g., 1 ms for subcarrier spacing (SCS) of 15 kHz). If the UE reports an unexpected value for t3, i.e., a value for t3 that is out of the range expected by the LMF, the LMF can tag this report as a false report.

The LMF may also have knowledge of the satellite speed and ephemeris. Ignoring the mobility of the UE, which is negligible for LEO and MEO satellites, the LMF can estimate the relative difference between DL propagation delay, i.e., (t2−t1), and uplink (UL) propagation delay, i.e., (t4−t3). The LMF can then calculate a ratio of |(t4−t3)/(t2−t1)| and determine if the ratio it is smaller than a threshold value. The threshold value may depend on the satellite ephemeris, e.g., speed and location of the satellite.

Based on the foregoing, the LMF may verify the validity of the reported measurements by the UE.

For an accurate UE location estimation, the LMF should use multiple measurements for t1, t2, t3, and t4. If the reported values are verified, the LMF may calculate the RTT, e.g., by using Equation (14), multiple times, at different occasions, and estimate the UE location.

If the reported values do not pass the verification criteria described above, e.g., after L times of failing to verify, the LMF can declare the reporting UE as a malicious UE and report it to the higher layers of the network, e.g., an AMF. Upon such a malicious attempt the AMF may disconnect the UE and inform a RAN node via an appropriate NGAP cause value, such that the RAN can take appropriate punitive actions on subsequent connection attempts by the same UE.

Figure 13:
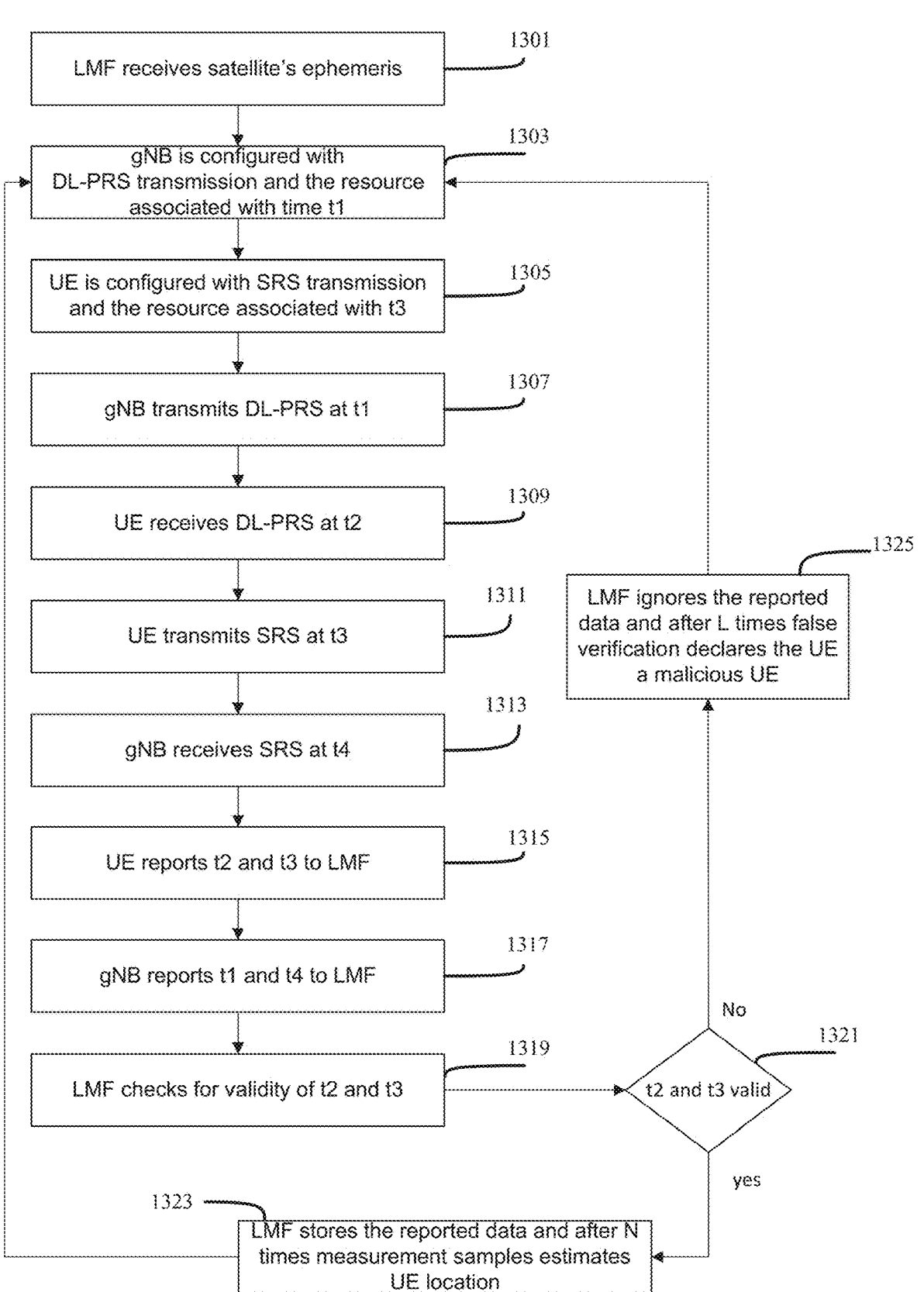
FIG. 13 is Multi-RTT network verified procedure in which a UE's report is verified by LMF.

FIG. 13 is a flow chart illustrating a multi-RTT network verified procedure, according to an embodiment.

Referring to FIG. 13, in step 1301, an LMF receives a satellite's ephemeris.

In step 1303, a gNB is configured with a DL-PRS transmission and a resource associated with time t1.

In step 1305, a UE is configured with an SRS transmission and a resource associated with t3.

In step 1307, the gNB transmits a DL-PRS at t1, and in step 1309, the UE receives the DL-PRS at t2.

In step 1311, the UE transmits an SRS at t3, and in step 1313, the UE receives the SRS at t4.

In step 1315, the UE reports t2 and t3 to the LMF.

In step 1317, the gNB reports t1 and t4 to the LMF.

In step 1319, the LMF checks for validity of t2 and t3. That is, the LMF can estimate the relative difference between DL propagation delay, i.e., (t2−t1), and UL propagation delay, i.e., (t4−t3), and then calculate a ratio of |((t4−t3))/((t2−t1))| and determine if the ratio of it is smaller than a threshold value. The threshold value may depend on the satellite ephemeris, e.g., speed and location of the satellite.

If t2 and t3 are valid in step 1321, the LMF stores the reported data, and after steps 1303 to 1321 are completed as being valid N times, estimates the UE location in step 1323. For example, for an accurate measurement in a single satellite case, N should be at least 4. For multiple satellites, N can be smaller, e.g., 2 or 3. Although a larger N would like increase the accuracy of the measurements, N cannot be so large because a gap between measurements should be large enough, e.g., 10 to 20 seconds, and typically, the whole measurement process should be over in less than a minute.

If t2 and t3 are not valid in step 1321, the LMF ignores the reported data, and after steps 1303 to 1321 are completed as being invalid L times, declares the UE a malicious UE in step 1325. For example, L=3 or 4.

It is noted that the respective values of N and L may vary depending on system requirements.

However, there are cases where averaging is not an issue (e.g., GEO satellites). Thus, in these types of cases, a new UE capability may be preferred.

Instead of reporting an average of four measurements, a UE may report each individual instance with an individual time stamp for each of the measurements. A gNB may then perform the averaging itself while compensating for satellite motion. This operation may utilize new signaling, wherein the UE reports a list of positioning measurements, each one with its own time stamp. The UE may report each individual measurement, but it would create significant overhead. Also, the time stamps may be implicit. That is, the measurements could be listed in order of the measurements made, etc.

A UE may compensate itself for satellites motion. The UE may then send a single averaged measurement with a single time stamp.

Signaling Between Network and UE

In the above embodiments, various signaling is performed between a network and a UE to send and receive configu-

---

Time Stamp Requirements

When performing positioning measurements, a UE typically averages four individual measurements. Per 3GPP TS 38.133 V17.6.0 (2022-06), Section 9.9.2.5:

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

\*\*\*\*\*\*

When physical layer receives last of NR-TDOA-ProvideAssistanceData message and NR-TDOA-RequestLocationInformation message from LMF via LPP [34], the UE shall be able to measure multiple (up to the UE capability specified in Clause 9.9.2.3) DL RSTD measurements, defined in TS 38.215 [4], during the measurement period TRSTD, Total defined as:

$$T_{RSTD,Total} = \Sigma_{i=1}^{L} T_{RSTD,i} + (L - 1) * \max(T_{effect,i})$$

Where, i is the index of positioning frequency layer,

L is total number of positioning frequency layers, and $T_{effect,i}$ is the periodicity of the PRS RSTD measurement in positioning frequency layer i $T_{RSTD,i}$ is the measurement period for PRS RSTD measurement in positioning frequency layer i as specified below:

$$T_{RSTD,i} =$$

$$\left( CSSF_{PRS,i} * \text{ceil}(K_{p,PRS,i}) * N_{RxBeam,i} * \left\lceil \frac{N_{PRS,i}^{slot}}{N'} \right\rceil \left\lceil \frac{L_{available\_PRS,i}}{N} \right\rceil * N_{sample} - 1 \right) *$$

$$T_{effect,i} + T_{last,i},$$

where:

[ . . . ]

$N_{sample}$ is the number of PRS RSTD samples and

If UE supports [M-sample measurements], and the LMF indicates the UE to perform positioning measurements with reduced number of samples, and PRS bandwidth is within the active BWP and difference between the serving cell SS-RSRP and neighboring cell/TRP PRS-RSRP is within 6 dB, $N_{sample} = 1$.

If UE supports [M-sample measurements], and the LMF indicates the UE to perform positioning measurements with reduced number of samples, and PRS bandwidth is not within the active BWP or difference between the serving cell SS-RSRP and neighboring cell/TRP PRS-RSRP is more than 6 dB, $N_{sample} = 2$. Otherwise, $N_{sample} = 4$.

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

---

If a UE performs a single measurement, the time stamp can be the measurement time. However, if the UE is to average several samples, there may be an issue if satellites have moved in a meaningful way between two samples, such that the averaging will lower positioning accuracy.

Accordingly to an embodiment, this type of lower positioning accuracy can be avoided in a number of ways.

More specifically, an NTN UE performing positioning may only use a single sample to do positioning. The UE reports its positioning measurement and a time stamp. In such a case, the reporting using a single sample is configured by a gNB and/or a UE capability. For example, a Rel-17 NTN UE could always support M-sample measurements.

rations, commands, measurements, etc. Such signaling may be performed through the following:

Satellite's ephemeris data and the real time difference between the satellite's reference point and the reference points of its neighboring satellites may be broadcast by the network in system information, e.g., in SIB or MIB.

Configuration/reconfiguration of a UE, or a group of UEs, with a target satellite and neighboring satellites may be done through RRC configuration or reconfiguration by a network. The network may assign a target satellite and a set of neighboring satellites to a group of UEs, and configure all UEs that belong to the group by a single RRC configuration operation.

Configuration/reconfiguration of a UE, or a group of UEs, with a DL-PRS may be done through RRC configuration or reconfiguration by a network. Similar to above, the network may form a group of UEs, and configure all UEs that belong to the group by a single RRC configuration operation.

Configuration/reconfiguration of a UE or a group of UEs with a target satellite, neighboring satellites, and a DL-PRS may be performed in one step RRC configuration/reconfiguration.

A network sends a command to a UE or a group of UEs to report measurement results (e.g., RSTD, and/or UE location, and/or Doppler frequency, and/or Doppler frequency rate-of-change, and/or time stamps) on a PDSCH using a MAC CE. UE reports the measurement results (RSTD, and/or UE location, and/or Doppler frequency, and/or Doppler frequency rate-of-change, and/or time stamps) to the network on the PUSCH using a MAC CE.

Timing Advance Estimation Using UE Location Verification

A timing advance, $T_{TA}$, applied by an NTN UE in all RRC states, i.e. RRC_IDLE/INACTIVE and RRC_CONNECTED, may be given by Equation (15).

$$T_{TA} = (N_{TA} + N_{TA,UE-specific} + N_{TA,common} + N_{TA,offset}) \times T_c \qquad (15)$$

In Equation (15), $N_{TA}$ is a network-controlled UE-specific TA that is updated based on a TA command field in msg2/msgB and a MAC CE TA command. $N_{TA}$ is set to 0 for preamble transmission during initial access.

$N_{TA,UE\_specific}$ is a UE-specific TA component that is estimated by the UE based on the UE's location and satellite's location in the space. $N_{TA,UE-specific}$ is a UE self-estimated TA to pre-compensate for a service link delay.

$N_{TA,common}$ is a network-controlled common TA, which may include any timing offset considered necessary by the network.

$N_{TA,offset}$ is a fixed offset and has been specified for a UL radio frame to finish before the start of a subsequent DL radio frame. $N_{TA,offset}$ value can be predetermined and/or given in a look-up table. The $N_{TA,offset}$ value depends on the system frequency range, and duplex mode (TDD vs. FDD). The network may implicitly include $N_{TA,offset}$ in $N_{TA,common}$.

$T_c$ is a fixed value specified by 3GPP NR equal to 1/(480,000×4096).

3GPP TS 38.133 V17.6.0 (2022-06) requires UEs to be equipped with GNSS devices, such that they are capable of estimating their locations. With GNSS capability, a UE is able to estimate the UE-specific TA using the GNSS information and the additional information that is provided to the UE by the network as explained above. This requirement, however, cannot always be fulfilled. For example, sometimes the GNSS signal is not readily available, or in some regions and locations, the GNSS signal may be too weak and below a required noise margin.

Moreover, the GNSS requirement increases UE manufacturing costs and increases UE power consumption as well, which is especially undesirable for small devices such as Internet of things (IoT) devices.

When a GNSS signal is very weak and below a required noise margin, or an NTN UE is not equipped with a GNSS device, the NTN UE will not be able to estimate $N_{TA,UE\_specific}$ in Equation (15).

According to an embodiment, in order to estimate $N_{TA,UE\_specific}$ without access to a GNSS signal, any of the solutions above for UE-assisted or network-based UE location verification may be used. That is, once the UE calculates its location $[x_u,y_u,z_u]$, it can then calculate $N_{TA,UE-specific}$ relative to the target satellite using ephemeris coordinates of the target satellite $[x_t,y_t,z_t]$ as shown in Equation (16).

$$N_{TA,UE-specific} = \frac{\sqrt{(x_u - x_t)^2 + (y_u - y_t)^2 + (z_u - z_t)^2}}{c \cdot T_c}$$

In Equation (16), c is the speed of light and $T_c$ is a fixed value specified by 3GPP NR equal to 1/(480,000×4096).

Figure 14:
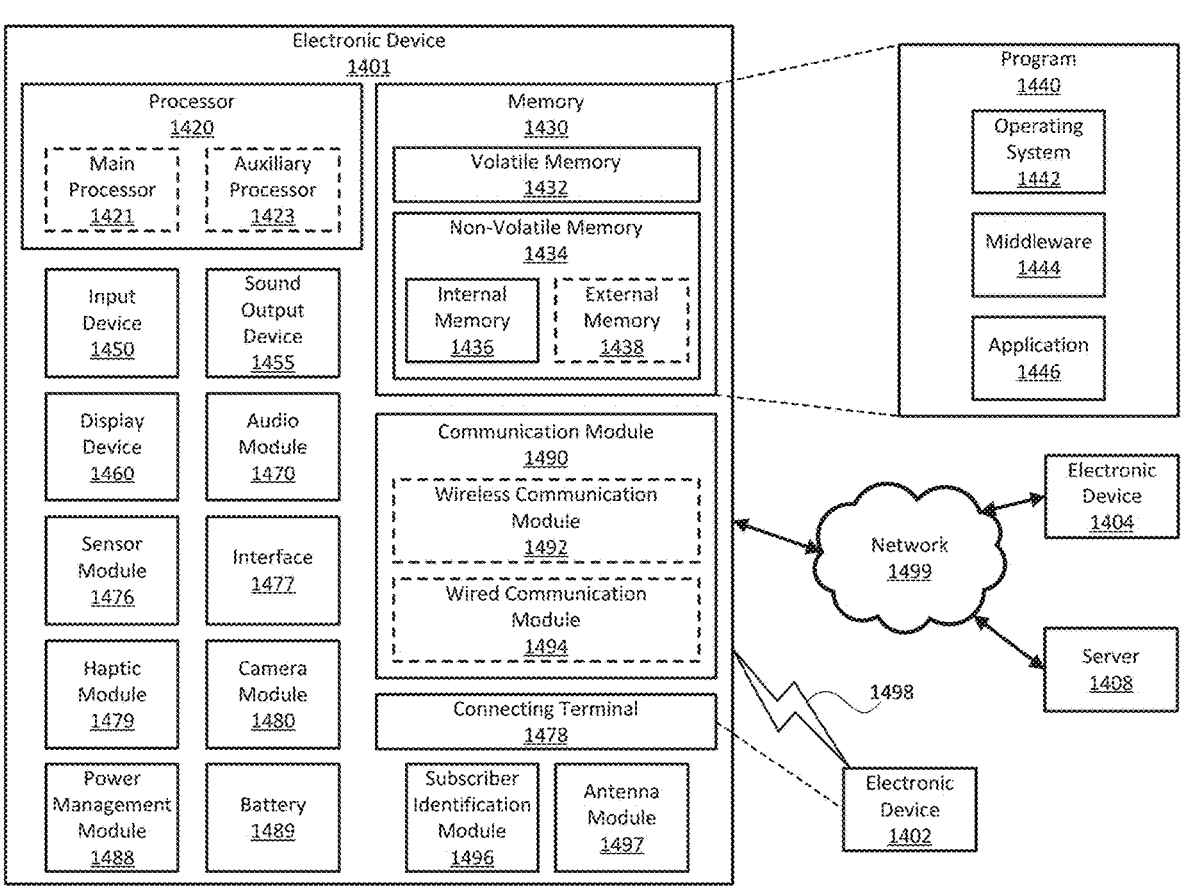
FIG. 14 is a block diagram of an electronic device in a network environment, according to an embodiment.

FIG. 14 is a block diagram of an electronic device in a network environment 1400, according to an embodiment.

Referring to FIG. 14, an electronic device 1401 in a network environment 1400 may communicate with an electronic device 1402 via a first network 1498 (e.g., a short-range wireless communication network), or an electronic device 1404 or a server 1408 via a second network 1499 (e.g., a long-range wireless communication network). The electronic device 1401 may communicate with the electronic device 1404 via the server 1408.

For example, the electronic device 1401 may be a UE as described above in connection with FIGS. 1-13.

The electronic device 1401 may include a processor 1420, a memory 1430, an input device 1450, a sound output device 1455, a display device 1460, an audio module 1470, a sensor module 1476, an interface 1477, a haptic module 1479, a camera module 1480, a power management module 1488, a battery 1489, a communication module 1490, a subscriber identification module (SIM) card 1496, or an antenna module 1497. In one embodiment, at least one (e.g., the display device 1460 or the camera module 1480) of the components may be omitted from the electronic device 1401, or one or more other components may be added to the electronic device 1401. Some of the components may be implemented as a single integrated circuit (IC). For example, the sensor module 1476 (e.g., a fingerprint sensor, an iris sensor, or an illuminance sensor) may be embedded in the display device 1460 (e.g., a display).

The processor 1420 may execute software (e.g., a program 1440) to control at least one other component (e.g., a hardware or a software component) of the electronic device 1401 coupled with the processor 1420 and may perform various data processing or computations.

As at least part of the data processing or computations, the processor 1420 may load a command or data received from another component (e.g., the sensor module 1476 or the communication module 1490) in volatile memory 1432, process the command or the data stored in the volatile memory 1432, and store resulting data in non-volatile memory 1434. The processor 1420 may include a main processor 1421 (e.g., a central processing unit (CPU) or an application processor (AP)), and an auxiliary processor 1423 (e.g., a graphics processing unit (GPU), an image signal processor (ISP), a sensor hub processor, or a communication processor (CP)) that is operable independently from, or in conjunction with, the main processor 1421. Additionally or alternatively, the auxiliary processor 1423 may be adapted to consume less power than the main processor 1421, or execute a particular function. The auxiliary processor 1423 may be implemented as being separate from, or a part of, the main processor 1421.

The auxiliary processor 1423 may control at least some of the functions or states related to at least one component (e.g., the display device 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). The auxiliary processor 1423 (e.g., an image signal processor or a communication processor) may be implemented as part of another component (e.g., the camera module 1480 or the communication module 1490) functionally related to the auxiliary processor 1423.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434. Non-volatile memory 1434 may include internal memory 1436 and/or external memory 1438.

The program 1440 may be stored in the memory 1430 as software, and may include, for example, an operating system (OS) 1442, middleware 1444, or an application 1446.

The input device 1450 may receive a command or data to be used by another component (e.g., the processor 1420) of the electronic device 1401, from the outside (e.g., a user) of the electronic device 1401. The input device 1450 may include, for example, a microphone, a mouse, or a keyboard.

The sound output device 1455 may output sound signals to the outside of the electronic device 1401. The sound output device 1455 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1460 may visually provide information to the outside (e.g., a user) of the electronic device 1401. The display device 1460 may include, for example, a display, a hologram device, or a projector and control circuitry to control a corresponding one of the display, hologram device, and projector. The display device 1460 may include touch circuitry adapted to detect a touch, or sensor circuitry (e.g., a pressure sensor) adapted to measure the intensity of force incurred by the touch.

The audio module 1470 may convert a sound into an electrical signal and vice versa. The audio module 1470 may obtain the sound via the input device 1450 or output the sound via the sound output device 1455 or a headphone of an external electronic device 1402 directly (e.g., wired) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. The sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device 1402 directly (e.g., wired) or wirelessly. The interface 1477 may include, for example, a high-definition multimedia interface (HDMI), a universal serial bus (USB) interface, a secure digital (SD) card interface, or an audio interface.

A connecting terminal 1478 may include a connector via which the electronic device 1401 may be physically connected with the external electronic device 1402. The connecting terminal 1478 may include, for example, an HDMI connector, a USB connector, an SD card connector, or an audio connector (e.g., a headphone connector).

The haptic module 1479 may convert an electrical signal into a mechanical stimulus (e.g., a vibration or a movement) or an electrical stimulus which may be recognized by a user via tactile sensation or kinesthetic sensation. The haptic module 1479 may include, for example, a motor, a piezoelectric element, or an electrical stimulator.

The camera module 1480 may capture a still image or moving images. The camera module 1480 may include one or more lenses, image sensors, image signal processors, or flashes. The power management module 1488 may manage power supplied to the electronic device 1401. The power management module 1488 may be implemented as at least part of, for example, a power management integrated circuit (PMIC).

The battery 1489 may supply power to at least one component of the electronic device 1401. The battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the AP) and supports a direct (e.g., wired) communication or a wireless communication. The communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as BLUETOOTH™, wireless-fidelity (Wi-Fi) direct, or a standard of the Infrared Data Association (IrDA)) or the second network 1499 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The antenna module 1497 may transmit or receive a signal or power to or from the outside (e.g., the external electronic device) of the electronic device 1401. The antenna module 1497 may include one or more antennas, and, therefrom, at least one antenna appropriate for a communication scheme used in the communication network, such as the first network 1498 or the second network 1499, may be selected, for example, by the communication module 1490 (e.g., the wireless communication module 1492). The signal or the power may then be transmitted or received between the communication module 1490 and the external electronic device via the selected at least one antenna.

Commands or data may be transmitted or received between the electronic device 1401 and the external electronic device 1404 via the server 1408 coupled with the second network 1499. Each of the electronic devices 1402 and 1404 may be a device of a same type as, or a different type, from the electronic device 1401. All or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1401. The electronic device 1401 may provide the outcome, with or without further processing of the outcome, as at least part of a reply to the request. To that end, a cloud computing, distributed computing, or client-server computing technology may be used, for example.

Figure 15:
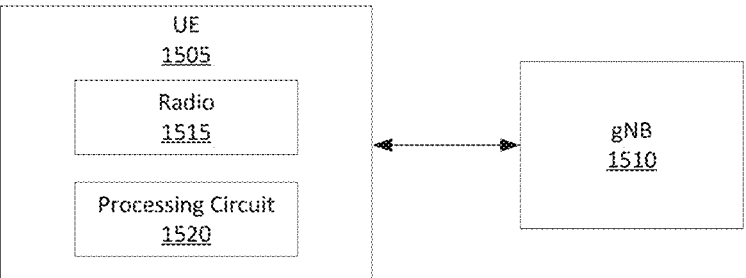
FIG. 15 illustrates a system including a UE and a gNB in communication with each other, according to an embodiment.

FIG. 15 illustrates a system including a UE 1505 and a gNB 1510, in communication with each other, according to an embodiment. The UE may include a radio 1515 and a processing circuit (or a means for processing) 1520, which may perform various methods disclosed herein, e.g., the method illustrated in FIG. 1. For example, the processing circuit 1520 may receive, via the radio 1515, transmissions from the network node (gNB) 1510, and the processing circuit 1520 may transmit, via the radio 1515, signals to the gNB 1510.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method of network verified user equipment (UE) location, the method comprising:

configuring, by a network device, a base station with a first resource for transmitting a positioning reference signal (PRS) to a UE at a time t1;

configuring, by the network device, the UE with a second resource for transmitting a sounding reference signal (SRS) to the base station at a time t3;

receiving, by the network device, from the base station, a value for t1 and a value for a time t4, wherein the base station is configured to receive the SRS from the UE at t4;

receiving, by the network device, from the UE, a value for a time t2 and a value for t3, wherein the UE is configured to receive the PRS from the base station at t2; and verifying, by the network device, the values for t2 and t3 received from the UE, based the received values for t1, t2, t3, and t4.

2. The method of claim 1, wherein the network device includes a location management function (LMF).

3. The method of claim 1, further comprising receiving, by the network device, a satellite's ephemeris.

4. The method of claim 3, wherein verifying the value for t2 received from the UE comprises:

determining a first difference between the received values for t4 and t3;

determining a second difference between the received values for t2 and t1; and comparing a ratio of the first difference to the second difference to a threshold value.

5. The method of claim 4, further comprising calculating the threshold value based on the satellite's ephemeris.

6. The method of claim 4, further comprising determining that the value for t2received from the UE is valid, based on the ratio of the first difference to the second difference being less than or equal to the threshold value.

7. The method of claim 4, further comprising determining that the value for t2received from the UE is invalid, based on the ratio of the first difference to the second difference being greater than the threshold value.

8. The method of claim 1, wherein verifying the value for t3 received from the UE comprises comparing the value for t3 received from the UE to the second resource configured for transmitting the SRS.

9. The method of claim 8, determining that the value for t3 received from the UE is valid, based on the value for t3 received from the UE being within an expected range based on the second resource configured for transmitting the SRS.

10. The method of claim 8, determining that the value for t3 received from the UE is invalid, based on the value for t3 received from the UE being outside of an expected range based on the second resource configured for transmitting the SRS.

11. A network device for performing network verified user equipment (UE) location, the network device comprising:

a processor; and a memory configured to store instructions, which when executed, control the processor to:

configure a base station with a first resource for transmitting a positioning reference signal (PRS) to a UE at a time t1, configure the UE with a second resource for transmitting a sounding reference signal (SRS) to the base station at a time t3, receive, from the base station, a value for t1 and a value for a time t4, wherein the base station is configured to receive the SRS from the UE at t4, receive, from the UE, a value for a time t2 and a value for t3, wherein the UE is configured to receive the PRS from the base station at t2, and verify, by the network device, the values for t2 and t3 received from the UE, based the received values for t1, t2, t3, and t4.

12. The network device of claim 11, wherein the network device comprises a location management function (LMF).

13. The network device of claim 11, wherein the instructions, when executed, further control the processor to receive a satellite's ephemeris.

14. The network device of claim 13, wherein the instructions, when executed, further control the processor to verify the value for t2 received from the UE by:

determining a first difference between the received values for t4 and t3;

determining a second difference between the received values for t2 and t1; and comparing a ratio of the first difference to the second difference to a threshold value.

15. The network device of claim 14, wherein the instructions, when executed, further control the processor to calculate the threshold value based on the satellite's ephemeris.

16. The network device of claim 14, wherein the instructions, when executed, further control the processor to determine that the value for t2 received from the UE is valid, based on the ratio of the first difference to the second difference being less than or equal to the threshold value.

17. The network device of claim 14, wherein the instructions, when executed, further control the processor to determine that the value for t2 received from the UE is invalid, based on the ratio of the first difference to the second difference being greater than the threshold value.

18. The network device of claim 11, wherein the instructions, when executed, further control the processor to verify the value for t3 received from the UE by comparing the value for t3 received from the UE to the second resource configured for transmitting the SRS.

19. The network device of claim 18, wherein the instructions, when executed, further control the processor to determine that the value for t3 received from the UE is valid, based on the 4 value for t3 received from the UE being within an expected range based on the second resource configured for transmitting the SRS.

20. The network device of claim 18, wherein the instructions, when executed, further control the processor to determine that the value for t2 received from the UE is invalid, based on the value for t3 received from the UE being outside of an expected range based on the second resource configured for transmitting the SRS.

* * * * *